United States Patent
Senoo et al.

(10) Patent No.: US 9,813,251 B2
(45) Date of Patent: Nov. 7, 2017

(54) COMMUNICATION CONTROL DEVICE, COMMUNICATION CONTROL SYSTEM AND COMMUNICATION CONTROL METHOD

(71) Applicant: FUJITSU LIMITED, Kawasaki-shi, Kanagawa (JP)

(72) Inventors: Hiroaki Senoo, Kawasaki (JP); Yoshiharu Tajima, Yokohama (JP); Dai Kimura, Yokohama (JP); Makoto Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/290,267

(22) Filed: Oct. 11, 2016

(65) Prior Publication Data

US 2017/0141931 A1    May 18, 2017

(30) Foreign Application Priority Data

Nov. 16, 2015 (JP) ................................. 2015-223840

(51) Int. Cl.
| | |
|---|---|
| H04M 11/00 | (2006.01) |
| H04L 12/14 | (2006.01) |
| H04W 8/20 | (2009.01) |
| H04W 48/18 | (2009.01) |
| H04W 72/04 | (2009.01) |
| H04W 4/24 | (2009.01) |

(52) U.S. Cl.
CPC .......... *H04L 12/1446* (2013.01); *H04W 4/24* (2013.01); *H04W 8/205* (2013.01); *H04W 48/18* (2013.01); *H04W 72/0453* (2013.01)

(58) Field of Classification Search
CPC .................................................. H04L 12/1446

USPC ......................................................... 455/408
See application file for complete search history.

(56) References Cited

U.S. PATENT DOCUMENTS

| | | | |
|---|---|---|---|
| 2010/0130170 A1* | 5/2010 | Liu ................... | H04W 36/0022 455/411 |
| 2012/0166604 A1 | 6/2012 | Fortier et al. | |
| 2015/0207860 A1 | 7/2015 | Kan et al. | |

FOREIGN PATENT DOCUMENTS

| | | |
|---|---|---|
| JP | 2014-501475 | 1/2014 |
| WO | 2012092225 | 7/2012 |
| WO | 2014024545 | 2/2014 |

* cited by examiner

*Primary Examiner* — Joel Ajayi
(74) *Attorney, Agent, or Firm* — Fujitsu Patent Center

(57) ABSTRACT

A communication control device, includes a terminal information acquisition unit which acquires terminal-related information including communication service information relating to a communication service executed, and network information relating to a network, a selection unit which selects, among a plurality of combinations of networks each of which can be used by each of a plurality of communication services, a combination of networks having a smallest total communication cost to be charged for each of the plurality of communication services in each of the plurality combinations of networks, on the basis of the terminal-related information, and network-related information including communication cost information, and communication bandwidth information, and a network control unit which executes a network control such that the networks used respectively by each of the plurality of communication services are the selected combination of networks.

14 Claims, 29 Drawing Sheets

FIG.3

FIRST EMBODIMENT

NETWORK-RELATED INFORMATION

| NETWORK | COMMUNICATION COST (YEN/Mbps) | ALLOCABLE COMMUNICATION BANDWIDTH (Mbps) |
|---|---|---|
| NETWORK N1 | 10 | 20 |
| NETWORK N2 | 1 | 10 |

FIG.4

FIRST EMBODIMENT
TERMINAL-RELATED INFORMATION
(COMMUNICATION CONTROL DEVICE SIDE)

| TERMINAL DEVICE | COMMUNICATION SERVICE | NEEDED COMMUNICATION BANDWIDTH (Mbps) | CONNECTABLE NETWORK |
|---|---|---|---|
| TERMINAL DEVICE 100-1 | COMMUNICATION SERVICE S1 | 10 | N1,N2 |
| TERMINAL DEVICE 100-2 | COMMUNICATION SERVICE S2 | 5 | N1,N2 |

FIRST EMBODIMENT

TERMINAL-RELATED INFORMATION (TERMINAL DEVICE SIDE)

| COMMUNICATION SERVICE | NEEDED COMMUNICATION BANDWIDTH (Mbps) | CONNECTABLE NETWORK |
|---|---|---|
| COMMUNICATION SERVICE S1 | 10 | N1,N2 |
| COMMUNICATION SERVICE S2 | 5 | |
| ... | ... | |
| COMMUNICATION SERVICE Sn | 8 | |

FIRST EMBODIMENT (SECOND MODIFICATION)

| APPLICATION PROGRAM NAME | NEEDED COMMUNICATION BANDWIDTH (Mbps) |
|---|---|
| COMMUNICATION SERVICE S1 PROGRAM (MOVING IMAGE DELIVERY PROGRAM) | 10 |
| COMMUNICATION SERVICE S2 PROGRAM (MUSIC DELIVERY PROGRAM) | 5 |
| ... | ... |
| COMMUNICATION SERVICE Sm PROGRAM (m ≥ n) (NET GAME PROGRAM) | 15 |

FIRST EMBODIMENT (SECOND MODIFICATION)

TERMINAL-RELATED INFORMATION
(COMMUNICATION CONTROL DEVICE SIDE)

| TERMINAL DEVICE | COMMUNICATION SERVICE | APPLICATION PROGRAM NAME | CONNECTABLE NETWORK |
|---|---|---|---|
| TERMINAL DEVICE 100-1 | COMMUNICATION SERVICE S1 | COMMUNICATION SERVICE S1 PROGRAM (MOVING IMAGE DELIVERY PROGRAM) | N1,N2 |
| TERMINAL DEVICE 100-2 | COMMUNICATION SERVICE S2 | COMMUNICATION SERVICE S2 PROGRAM (MUSIC DELIVERY PROGRAM) | N1,N2 |

FIG.14

SECOND EMBODIMENT
MCS INFORMATION

NETWORK N1

| MCS | MAXIMUM COMMUNICATION BANDWIDTH (Mbps) |
|---|---|
| 1 | 15 |
| 2 | 23 |
| 3 | 25 |

2211

NETWORK N2

| MCS | MAXIMUM COMMUNICATION BANDWIDTH (Mbps) |
|---|---|
| 101 | 6 |
| 102 | 9 |
| 103 | 12 |

FIG.15

SECOND EMBODIMENT
TERMINAL-RELATED INFORMATION
(COMMUNICATION CONTROL DEVICE SIDE)

| TERMINAL DEVICE | COMMUNICATION SERVICE | NEEDED COMMUNICATION BANDWIDTH (Mbps) | MCS | CONNECTABLE NETWORK |
|---|---|---|---|---|
| TERMINAL DEVICE 100-1 | COMMUNICATION SERVICE S1 | 10 | N1:3 N2:102 | N1,N2 |
| TERMINAL DEVICE 100-2 | COMMUNICATION SERVICE S2 | 5 | N1:2 N2:103 | N1,N2 |

SECOND EMBODIMENT

NETWORK-RELATED INFORMATION

| NETWORK | COMMUNICATION COST (YEN/Mbps) | ALLOCABLE COMMUNICATION BANDWIDTH (Mbps) |
|---|---|---|
| NETWORK N1 | 10 | COMMUNICATION SERVICE S1:25 COMMUNICATION SERVICE S2:23 |
| NETWORK N2 | 1 | COMMUNICATION SERVICE S1:9 COMMUNICATION SERVICE S2:12 |

FIG.18

SECOND EMBODIMENT

RATIO OF ALLOCATED RESOURCES  F1

| NETWORK<br>COMMUNICATION SERVICE | N1 | N2 |
|---|---|---|
| S1 | (10/25=)<br>40% | (10/9=)<br>112% |
| S2 | (5/23=)<br>22% | (5/12=)<br>42% |

F2

| COMBINATION | NETWORK N1 | NETWORK N2 | TOTAL RATIO OF ALLOCATED RESOURCES | |
|---|---|---|---|---|
| | | | NETWORK N1 | NETWORK N2 |
| A | S1:10Mbps<br>S2:5Mbps | NONE | (40+22=)<br>66% | 0% |
| B | S1:10Mbps | S2:5Mbps | 40% | 42% |
| C | S2:5Mbps | S1:10Mbps | 22% | 112% |
| D | NONE | S1:10Mbps<br>S2:5Mbps | 0% | (112+42=)<br>156% |

FIG.19

THIRD EMBODIMENT

TERMINAL-RELATED INFORMATION
(COMMUNICATION CONTROL DEVICE SIDE)

| TERMINAL DEVICE | COMMUNICATION SERVICE | NEEDED COMMUNICATION BANDWIDTH (Mbps) | SCHEDULED DATA VOLUME (Mbit) | CONNECTABLE NETWORK |
|---|---|---|---|---|
| TERMINAL DEVICE 100-1 | COMMUNICATION SERVICE S1 | 10 | 10 | N1,N2 |
| TERMINAL DEVICE 100-2 | COMMUNICATION SERVICE S2 | 5 | 100 | N1,N2 |

SIXTH EMBODIMENT

NETWORK-RELATED INFORMATION

| NETWORK | COMMUNICATION COST (YEN/Mbps) | ALLOCABLE COMMUNICATION BANDWIDTH (Mbps) | DELAY PERFORMANCE (ms) | JITTER PERFORMANCE (ms) | PACKET LOSS PERFORMANCE (%) |
|---|---|---|---|---|---|
| NETWORK N1 | 10 | 20 | 100 | 10 | 0.1 |
| NETWORK N2 | 1 | 10 | 10 | 1 | 1 |

SIXTH EMBODIMENT

TERMINAL-RELATED INFORMATION
(COMMUNICATION CONTROL DEVICE SIDE)

| TERMINAL DEVICE | COMMUNICATION SERVICE | NEEDED COMMUNICATION BANDWIDTH (Mbps) | NEEDED DELAY PERFORMANCE (ms) | NEEDED JITTER PERFORMANCE (ms) | NEEDED PACKET LOSS PERFORMANCE (%) | CONNECTABLE NETWORK |
|---|---|---|---|---|---|---|
| TERMINAL DEVICE 100-1 | COMMUNICATION SERVICE S1 | 10 | 200ms OR LESS | 12ms OR LESS | 0.5% OR LESS | N1,N2 |
| TERMINAL DEVICE 100-2 | COMMUNICATION SERVICE S2 | 5 | 100ms OR LESS | 10ms OR LESS | 2% OR LESS | N1,N2 |

2207

2208

2209

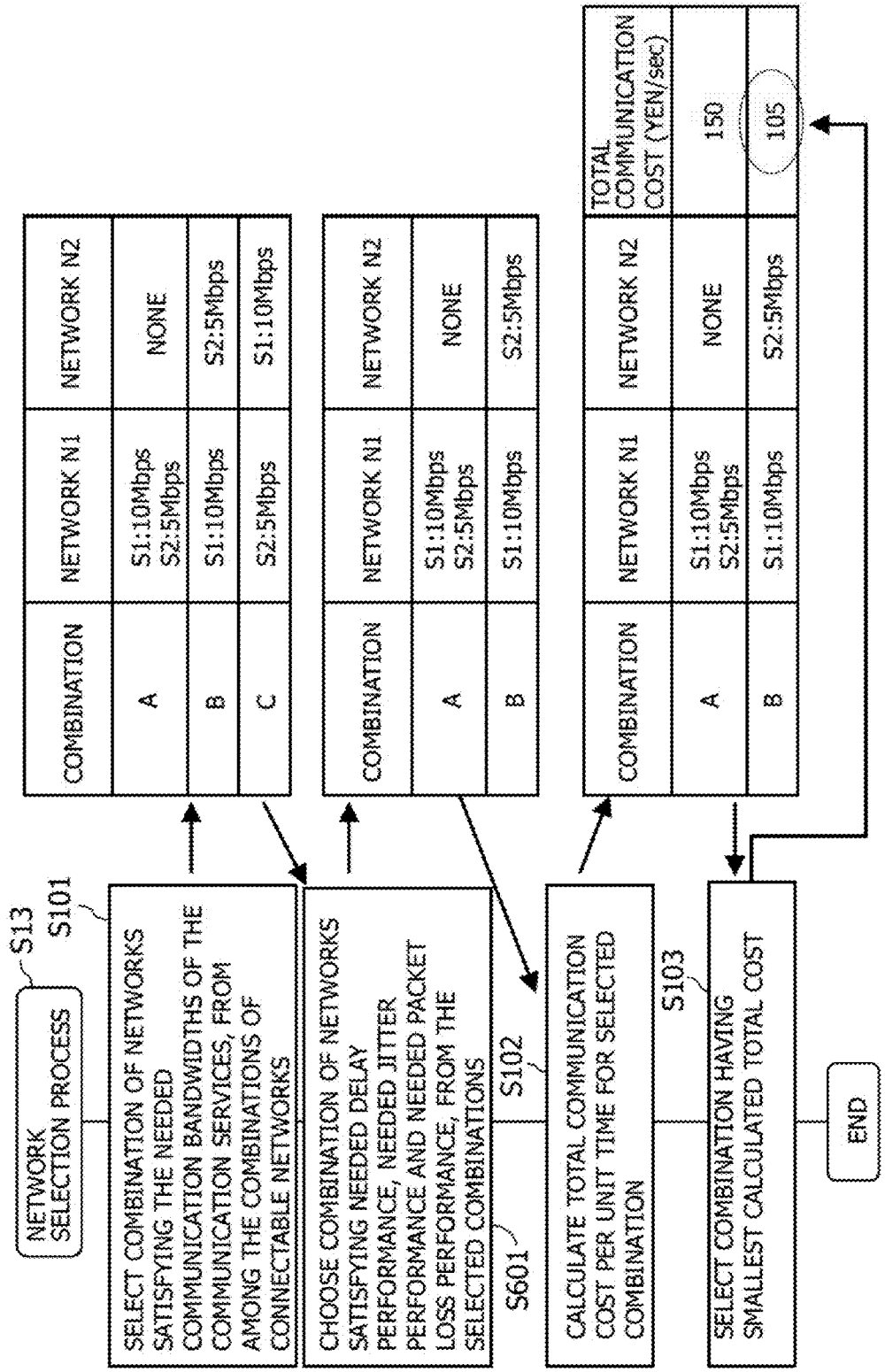

COMMUNICATION CONTROL DEVICE, COMMUNICATION CONTROL SYSTEM AND COMMUNICATION CONTROL METHOD

CROSS-REFERENCE TO RELATED APPLICATION

This application is based upon and claims the benefit of priority of the prior Japanese Patent Application No. 2015-223840, filed on Nov. 16, 2015, the entire contents of which are incorporated herein by reference.

FIELD

The present invention relates to a communication control device, a communication control system and a communication control method.

BACKGROUND

In recent years, attention has been focused on mobile communication operators known as "mobile virtual network operators" (MVNO). An MVNO does not own a network, but rather leases a network from another operator which owns a network ("mobile network operator" (MNO)), and provides mobile communication services to users under its own brand, using the network. The MVNO, for example, pays a communication cost to the MNO in accordance with the volume of communication performed by the users of the MVNO using the network.

Furthermore, the MVNO, for example, may lease communication networks from a plurality of MNOs. In this case, the MVNO pays a communication cost to the plurality of MNOs.

Technology relating to communication costs is disclosed in Japanese National Publication of International Patent Application No. 2014-501475 and International Publication Pamphlet No. WO 2014/024545 indicated below.

SUMMARY

According to an aspect of the embodiments, a communication control device, includes a terminal information acquisition unit which acquires, from a terminal device, terminal-related information including communication service information relating to a communication service executed by the terminal device, and network information relating to a network to which the terminal device can connect, from among a plurality of networks, a selection unit which selects, among a plurality of combinations of networks each of which can be used by each of a plurality of communication services executed by a plurality of terminal devices respectively, a combination of networks having a smallest total communication cost to be charged for each of the plurality of communication services in each of the plurality combinations of networks, on the basis of the terminal-related information, and network-related information including communication cost information relating to a cost to be charged for using the networks, and communication bandwidth information relating to communication bandwidth that can be allocated to the terminal device, and a network control unit which executes a network control such that the networks used respectively by each of the plurality of communication services are the selected combination of networks.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of network-related information 2204.

FIG. 4 is a diagram illustrating an example of terminal-related information 2207.

FIG. 6 is a diagram illustrating an example of the terminal-related information 1205 on the terminal device side.

FIG. 11 is a diagram illustrating an example of the needed communication bandwidth information 2210.

FIG. 12 is a diagram illustrating an example of terminal-related information according to a second modification example.

FIG. 14 is a diagram illustrating an example of the MCS information 2211.

FIG. 15 is a diagram illustrating an example of the terminal-related information 2207.

FIG. 16 is a diagram illustrating an example of the network-related information 2204 according to a second embodiment.

FIG. 18 is a diagram illustrating an example of the ratio of resources for each of the communication services being executed by the terminal devices, and the total ratio of resources for each combination.

FIG. 19 is a diagram illustrating an example of the terminal-related information 2207 according to the third embodiment.

FIG. 27 is a diagram illustrating an example of network-related information 2204 according to the sixth embodiment.

FIG. 28 is a diagram illustrating an example of the terminal-related information 2207 according to the sixth embodiment.

FIG. 29 is a diagram illustrating an example of a flowchart of the network selection process according to the sixth embodiment.

DESCRIPTION OF EMBODIMENTS

The communication cost of using a network varies depending on the MNO. Therefore, the total communication cost paid to an MNO by the MVNO varies depending on the extent to which the users of the MVNO have used which networks.

The network which is used by a user is set in accordance with the settings of the terminal device, for example. For instance, the user selects and connects to a network having a fast communication speed or a network having good radio conditions. In this way, when the user selects a network, the communication costs paid to the MNO by the MVNO varies with the settings of the terminal device.

<Example of Configuration of Communication System>

Figure 1:
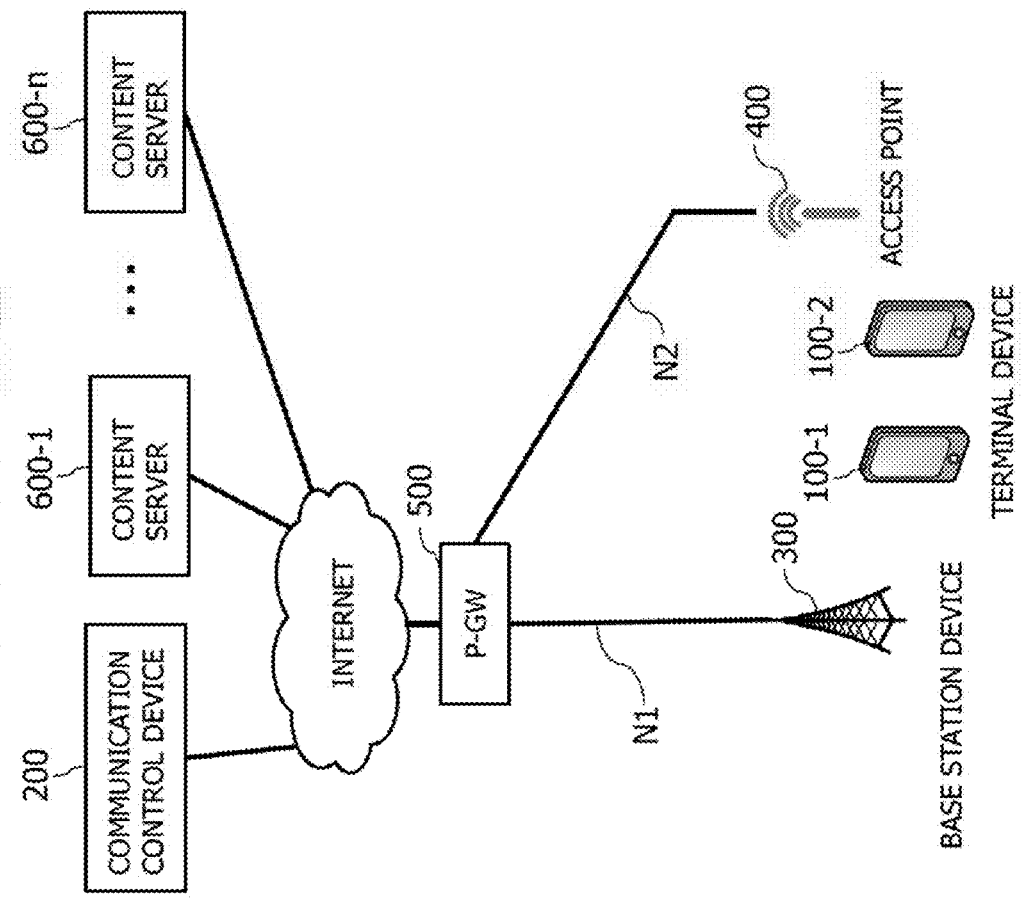
FIG. 1 is a diagram illustrating an example of the configuration of a communication system 10.

FIG. 1 is a diagram illustrating an example of the configuration of a communication system 10. The communication system 10 (also called communication control system) has terminal devices 100-1 and 2, a communication control device 200, a base station device 300, an access point 400, a packet data network gateway (P-GW) 500, and content servers 600-1 to n. Furthermore, the communication system 10 also has a network N1 operating via the base station device 300 and a network N2 operating via the access point 400. The network N1 is, for example a network which is compliant with long-term evolution (LTE). Furthermore, the network N2 is a network which is compliant with Wireless Fidelity (Wi-Fi). For example, the communication system 10 is used by an MVNO which leases the network N1 and the network N2 from the MNO.

The base station device 300 and the access point 400 connect wirelessly to the terminal devices 100-1 and 2, and perform a conversion process between wireless signals and wired signals. The base station device 300 is, for example, an evolved Node B (eNB) in LTE. Furthermore, the access point 400 is a wireless LAN router in a Wi-Fi system, for example.

The P-GW 500 is a device which relays a plurality of networks, and transmits received packets to a destination network. The P-GW 500 terminates the protocol of the connected networks.

The content servers 600-1 to n are servers which provide contents or services to the terminal devices 100-1 and 2. The terminal devices 100-1 and 2 are able to download various contents and receive the provision of services, by communicating with the content servers 600-1 to n.

The terminal devices 100-1 and 2 are communication devices which are used by a user of the communication system 10 and are, for example, a smartphone or a tablet terminal. In FIG. 1, there are two terminal devices 100, but there may be only one terminal device or three or more terminal devices.

Here, the processing of the respective devices constituting the communication system 10 is described in a case where the terminal device 100-1 downloads content from the content server 600-1.

The terminal device 100-1 communicates with the content server 600-1 via the network N1 or N2. The terminal device 100-1, when, for example, using the network N1, connects wirelessly with the base station device 300 and transmits to the base station device 300 asking for content downloading. P-GW 500 transmits a packet addressed to the content server 600-1 received from the base station device 300 via the Internet.

In the processing described above, the terminal device 100-1, for example, selects the network to use on the basis of the communication speed or radio conditions of the network, etc. In this method, the network used by the terminal device 100-1 is selected in accordance with the settings in the terminal device 100-1, and therefore a network which has a higher communication cost may be used. Furthermore, the network used by the terminal device 100-1 may have insufficient communication bandwidth, due to the fact that the terminal device 100-2 is using the network used by the terminal device 100-1, for example. In this case, there are situations where sufficient communication bandwidth for downloading content is not allocated to the terminal device 100-1.

Therefore, a communication control device 200 is provided in the communication system 10. When the terminal devices 100-1 and 2 communicate with the content server 600, the communication control device 200 selects the networks to which the terminal devices 100-1 and 2 are respectively to be connected. The communication control device 200 selects the combination of networks to which the terminal devices 100-1 and 2 are to be connected respectively on the basis of information about the communication bandwidth needed by the communication services executed by the terminal devices 100-1 and 2, and information such as the communication bandwidth and communication cost, etc. of the networks N1, N2. The communication control device 200 controls the terminal devices 100-1 and 2 and the networks N1, N2 so as to achieve the selected combination of networks.

In this way, in the communication system 10, rather than the terminal device 100 selecting the network to be used, it is the communication control device 200 that selects the network. By adopting this configuration, it is possible to select networks which result in the smallest total communication cost, while allocating, to the terminal devices, the communication bandwidths needed by the communication services executed by the terminal devices.

[First Embodiment]

To commence with, a first embodiment will be described.

In the first embodiment, the communication control device 200 selects a combination of networks which results in the smallest total communication cost to be paid for the respective communication services, on the basis of terminal-related information and network-related information, and controls the terminal devices and the networks so as to achieve the selected combination.

The terminal-related information is information which includes communication service information relating to the communication service executed by the terminal device, and network information that indicates which of the plurality of networks the terminal device can connect to. Furthermore, the network-related information is information including communication cost information about the cost to be paid for communication using the network, and communication bandwidth information about the bandwidth that can be allocated to the terminal device.

<Example of Configuration of Communication Control Device>

Figure 2:
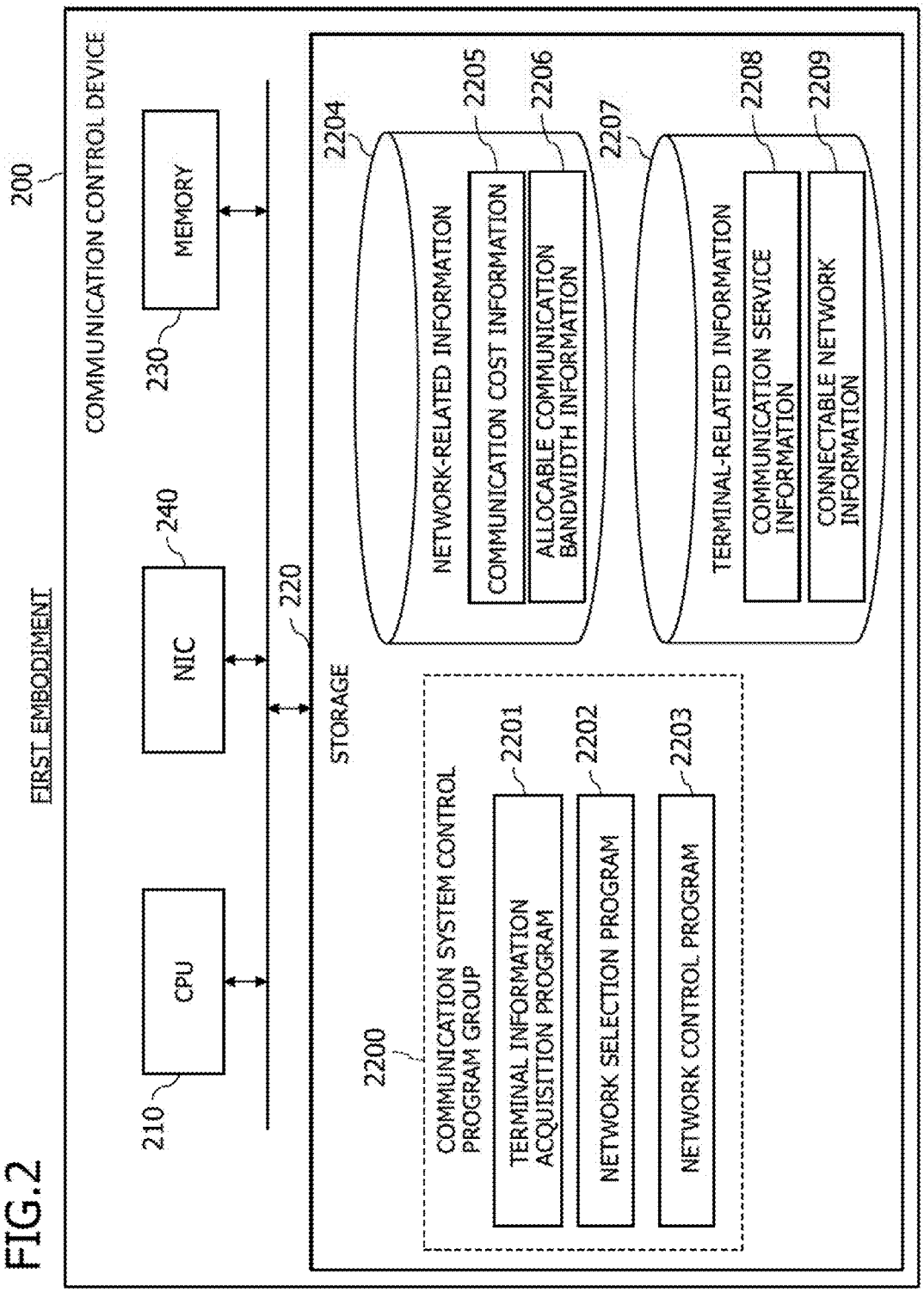
FIG. 2 is a diagram illustrating an example of the configuration of the communication control device 200.

FIG. 2 is a diagram illustrating an example of the configuration of the communication control device 200.

The communication control device 200 is, for example, a computer, which has a central processing unit (CPU) 210, a storage 220, a memory 230, and a network interface card (NIC) 240. The communication control device 200 is a device which controls the network to which a terminal device 100 executing a communication service is connected in the communication system 10.

The storage 220 is an auxiliary storage device which stores programs or data. The storage 220 stores a communication system control program group 2200, network-related information 2204 and terminal-related information 2207.

FIG. 3 is a diagram illustrating an example of network-related information 2204. The network-related information 2204 includes communication cost information 2205 and allocable communication bandwidth information 2206. The network-related information 2204 includes, as information elements, "network", "communication cost (yen/Mbps)" and "allocable communication bandwidth (Mbps)". The "network" is the name or number of the network to which the terminal device 100 connects. The communication cost information 2205 is the "communication cost (yen/Mbps)", which is, for example, the fee paid to the MNO by the MVNO when a communication bandwidth of 1 megabits per second (Mbps) is used for one second. In FIG. 3, if the terminal device 100 uses a communication bandwidth of 1 Mbps of the network N1 for one second, then the MVNO pays a fee of 10 yen to the MNO.

The allocable communication bandwidth information 2206 is the "allocable communication bandwidth (Mbps)", which indicates the maximum communication bandwidth when one terminal device 100 occupies one base station device configuring the network. In FIG. 3, the allocable communication bandwidth of the network N1 is 20 Mbps and hence a maximum communication bandwidth of 20 Mbps can be allocated to one terminal device 100. Furthermore, the network N1 can allocate communication bandwidth to a plurality of terminal devices 100, in such a manner that the total of the allocated communication bandwidth is no more than 20 Mbps.

The network-related information 2204 may, for example, be stored by an administrator of the communication system 10, or may be acquired from the devices which configure the networks.

FIG. 4 is a diagram illustrating an example of terminal-related information 2207. The terminal-related information 2207 includes communication service information 2208 and connectable network information 2209. The information elements of the terminal-related information 2207 are "terminal device", "communication service", "needed communication bandwidth (Mbps)" and "connectable networks". The "terminal device" is an identifier, such as an International Mobile Equipment Identity (IMEI), of the terminal device which is executing the communication service. The "communication service" is the name or identifier of the communication service. In FIG. 4, the communication service S1 is executed by the terminal device 100-1 and the communication service S2 is executed by the terminal device 100-2. The communication service information 2208 is the "needed communication bandwidth (Mbps)", which indicates the communication bandwidth needed by the communication service. The communication speed (communication bandwidth) needed by the communication service varies depending on the type of service provided. For example, if the communication service is for the delivery of moving images, then a fast communication speed is needed, and the needed communication bandwidth is larger. On the other hand, for instance, if the communication service is for the delivery of music, then the data volume communicated is smaller than moving image delivery, and the needed communication bandwidth is smaller. In FIG. 4, the communication service S1 is for moving image delivery and requires a communication bandwidth of 10 Mbps, but the communication service S2 is for music delivery and requires a communication bandwidth of 5 Mbps, which is smaller than the communication service S1.

The connectable network information 2209 is the "connectable networks", which means the networks to which the terminal device executing the communication service can be connected. In FIG. 4, the terminal devices executing communication services S1 and S2 can connect to networks N1 and N2.

The communication control device 200 acquires the terminal-related information 2207 from the terminal device 100, for example. The communication control device 200 may request the terminal device 100 to transmit terminal-related information, or may wait for the terminal device 100 to transmit the information spontaneously.

Returning to FIG. 2, the memory 230 is a region in which the program stored in the storage 220 is loaded. Furthermore, the memory 230 is also used as a region where a program stores data.

The NIC 240 is a device which connects to the network and performs communication. The NIC 240, for example, is connected to the Internet via a network cable. Furthermore, the NIC 240 can perform communication with the terminal device 100, via the Internet and the networks N1, N2.

The CPU 210 is a processor which loads a program stored in the storage 220, in the memory 230, and executes the loaded program to achieve various processes.

The CPU 210 controls the terminal device 100 and the networks N1, N2 of the communication system 10, by executing respective programs included in a communication system control program group 2200.

The CPU 210 constructs a terminal information acquisition unit which executes a terminal information acquisition process, by executing the terminal information acquisition program 2201. The terminal information acquisition process is a process for acquiring the terminal-related information from the terminal device 100. When the communication service starts, for example, the terminal device 100 transmits the terminal-related information to the communication control device 200. The communication control device 200 stores the terminal-related information received from the terminal device 100 as terminal-related information 2207 in the storage 220.

Furthermore, the CPU 210 constructs a selection unit which executes a network selection process by executing a network selection program 2202. The network selection process is a process for selecting a combination of networks to be allocated to respective communication services, on the basis of the network-related information 2204 and the terminal-related information 2207. As illustrated in FIG. 4, the communication service information includes information relating to the needed communication bandwidth indicating the communication bandwidth needed by the communication service. The communication control device 200 selects a plurality of combinations of networks which satisfy the needed communication bandwidths of each of the plurality of communication services. The communication control device 200 chooses the combination which results in the smallest total communication cost to be paid for the communication services to use the networks, from among the selected plurality of networks.

Moreover, the CPU 210 constructs a network control unit which executes a network control process, by executing the network control program 2203. The network control process is a process for controlling the networks used by each of the plurality of communication services, so as to be the chosen combination of networks. The communication control device 200 instructs the terminal devices 100 executing communication services which network to connect with, on the basis of the chosen combination of networks, for example. Furthermore, as in the fifth embodiment described below, the communication control device 200 instructs the server controlling the network or the network used by the communication service, for example, to perform communication at the needed communication bandwidth.

<Example of Configuration of Terminal Device>

Figure 5:
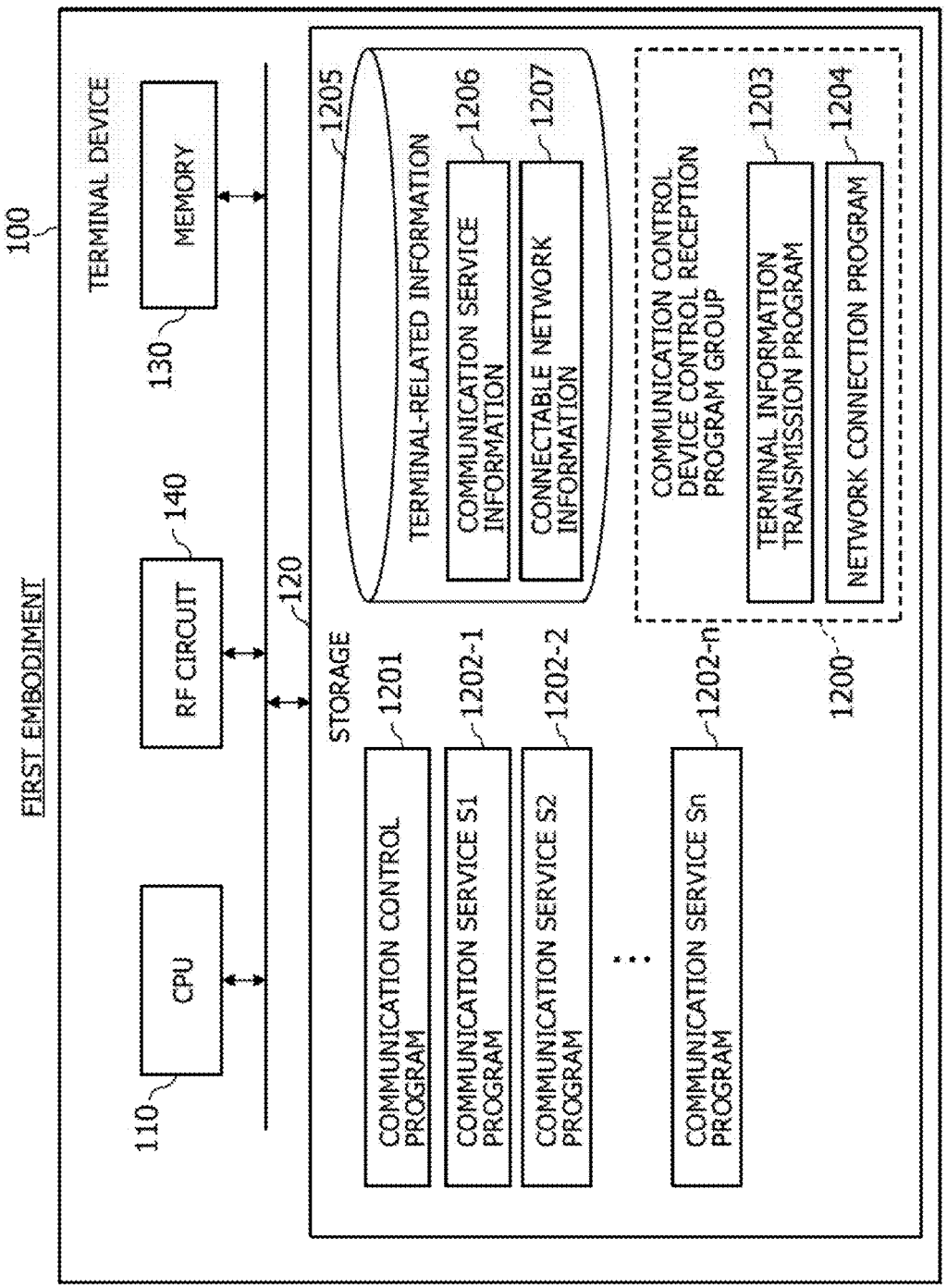
FIG. 5 is a diagram illustrating an example of the configuration of the terminal device 100.

FIG. 5 is a diagram illustrating an example of the configuration of the terminal device 100.

The terminal device 100 has a CPU 110, a storage 120, a memory 130, and an RF circuit 140. The terminal device 100 is a communication device which executes a communication service.

The storage 120 is an auxiliary storage device which stores program or data. The storage 120 stores a communication control device control reception program group 1200, a communication control program 1201, programs 1202-1 to n for communication services S1 to Sn, and terminal-related information 1205.

FIG. 6 is a diagram illustrating an example of the terminal-related information 1205 on the terminal device side. The terminal-related information 1205 includes communication service information 1206 and connectable network information 1207. The terminal-related information 1205 includes, as information elements, "needed communication bandwidth (Mbps)" and "connectable networks". The communication service information 1206 is the "needed communication bandwidth (Mbps)", and indicates the communication bandwidth needed by the communication service. The connectable network information 1207 is the "connectable networks", which stores a name or identifier of the networks to which the terminal device 100 can connect. The "connectable network" information is, for example, acquired at the time that a peripheral base station search is carried out either periodically by the terminal device 100, or due to the detection of variation in the peripheral radio conditions.

The memory 130 is a region into which the program stored in the storage 120 is loaded. Furthermore, the memory 130 is also used as a region where the program stores data.

The RF circuit 140 is a device which wirelessly connects with the base station device 300 or access point 400. The RF circuit 140 has an antenna (not illustrated) and transmits and receives a wireless signal via an antenna.

The CPU 110 is a processor which loads a program stored in the storage 120 to the memory 130, and executes the loaded program to achieve various processes.

The CPU 110 executes control performed by the communication control device, by executing the respective programs included in the communication control device control reception program group 1200.

The CPU 110 achieves a terminal information transmission process by executing the terminal information transmission program 1203. The terminal information transmission process is a process which transmits terminal-related information to the communication control device 200. The terminal device 100 may execute a terminal information transmission process in response to a request from the communication control device 200, or may execute the process spontaneously when the communication service is started.

Furthermore, the CPU 110 achieves a network connection process by executing a network connection program 1204. The network connection process is a process for connecting to the network instructed by the network control process in the communication control device 200. If executing a plurality of communication services, the terminal device 100 may be connected to different networks for each communication service. In the network connection process, the network selected as the connection destination is received from the communication control device 200, and the terminal device is connected to the instructed network by using a communication control program.

Furthermore, the CPU 110 executes a communication control program 1201, programs 1202-1 to n for communication services S1 to Sn, and the programs included in the communication control device control reception program group 1200. In the example in FIG. 5, the terminal device 100 stores the programs 1202-1 to n for communication services S1 to Sn, but the communication service program stored by the terminal device 100 may vary for each terminal device. Furthermore, there may be n or more communication service programs stored by the terminal device 100.

The CPU 110 achieves a communication control process by executing the communication control program 1201. The communication control process is a conventional process for controlling wireless communication which is performed by the terminal device 100. The communication control process involves a process for searching for base station devices and a wireless connection process with the base station device 300 or access point 400. Furthermore, in the communication control process, the communication performed by the communication service is controlled.

Furthermore, the CPU 110 executes respective communication services, by executing the programs 1202-1 to n for communication services S1 to Sn. For example, the communication service S1 is executed by executing the communication service S1 program. The communication service S1 connects to the network N1 or N2, and performs communication with the content server 600. The communication service S1 receives moving image data continuously from the content server 600, for example, and provides a moving image delivery service to a user of the terminal device 100, by reproducing the moving image data on a specific viewer. The communication service S1 is started or stopped by an operation by an user of the terminal device 100, for example.

<Communication System Control Process>

Figure 7:
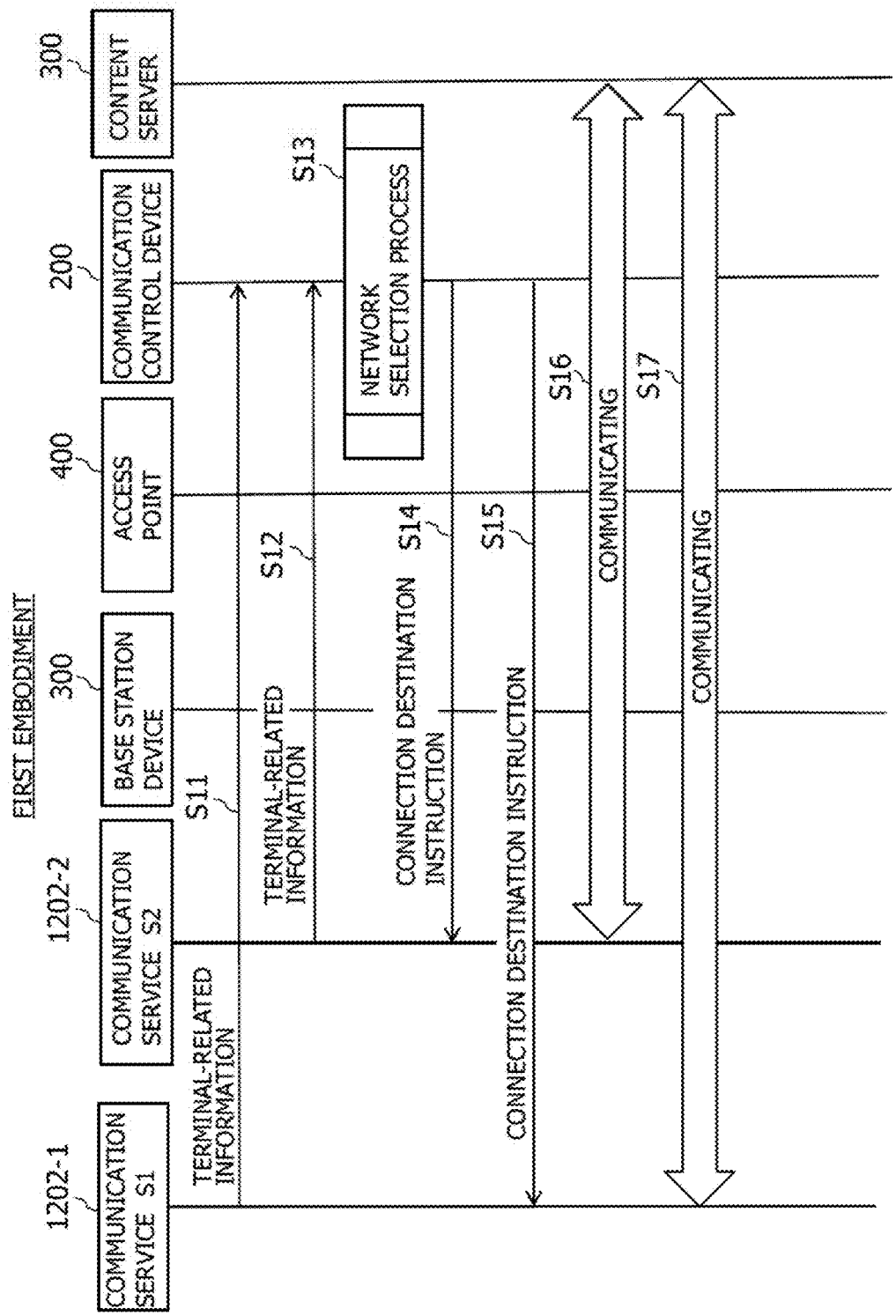
FIG. 7 is a diagram illustrating an example of a sequence of a communication system control process.

FIG. 7 is a diagram illustrating an example of a sequence of a communication system control process. Below, the communication system control process is described with reference to FIG. 7.

The communication service S1 is executed by the terminal device 100-1 and the communication service S2 is executed by the terminal device 100-2. The communication service S1 transmits the terminal-related information to the communication control device 200, for example, when a communication service is started or upon request from the communication control device 200 (S11). Upon receiving terminal-related information, the communication control device 200 stores this information as terminal-related information 2207. Similarly, the communication service S2 transmits terminal-related information to the communication control device 200 (S12), and the communication control device 200 stores this information as the terminal-related information 2207.

Figure 8:
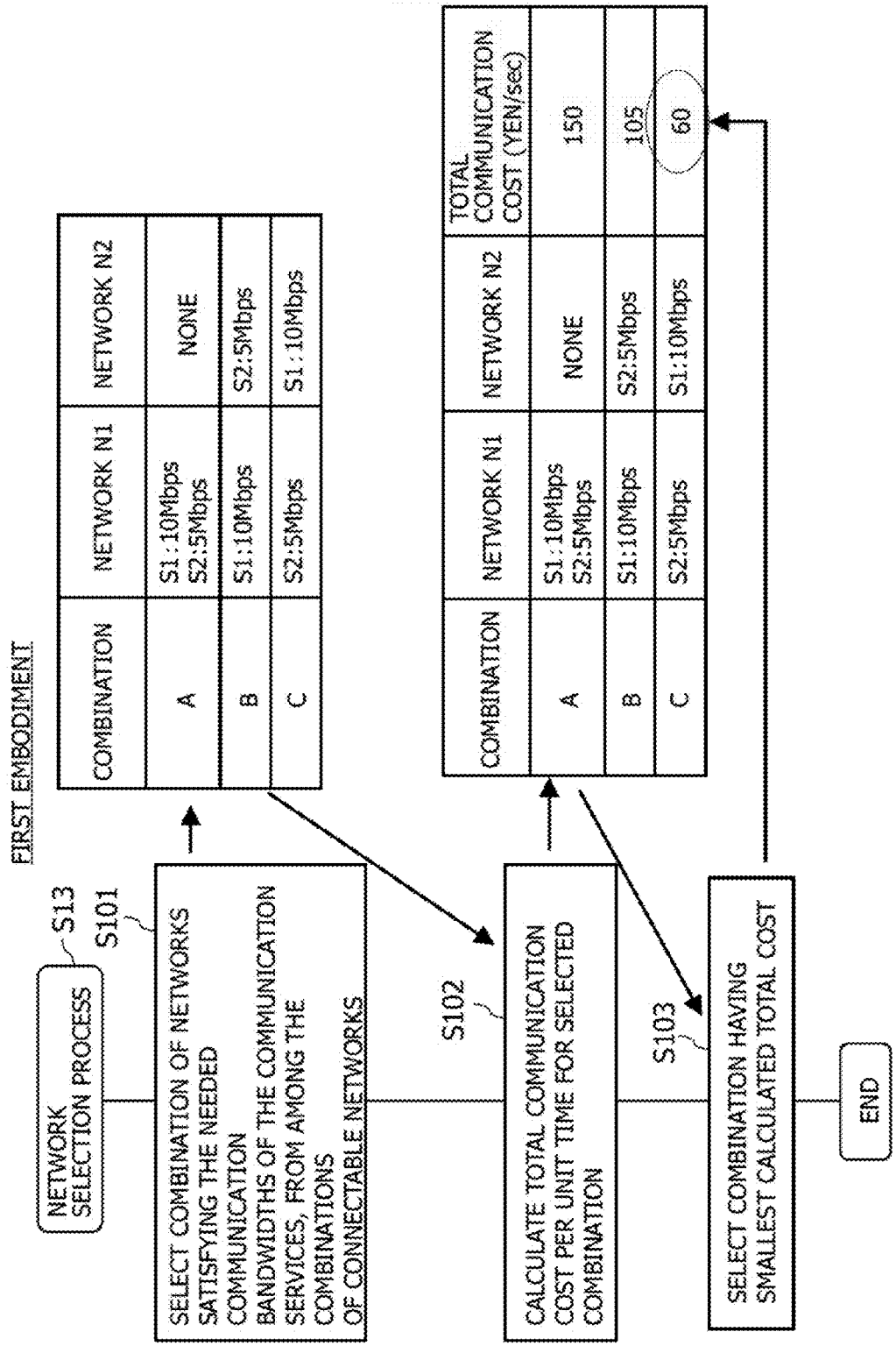
FIG. 8 is a diagram illustrating an example of a flowchart of the network selection process.

Next, the communication control device 200 carries out a network selection process (S13). FIG. 8 is a diagram illustrating an example of a flowchart of the network selection process.

In the network selection process, a combination of a plurality of networks which satisfy the needed communication bandwidths of the respective communication services, executed by a plurality of terminal devices respectively, are selected, from among the combinations of connectable networks (S101). The combinations of networks selected by S101 are combinations of networks which can be used by the plurality of communication services. In the example in FIG. 4, the needed communication bandwidth of the communication service S1 is 10 Mbps, and the needed communication bandwidth of the communication service S2 is 5 Mbps, and the connectable networks for the communication services S1 and S2 are the networks N1 and N2. Furthermore, in the example in FIG. 3, the allocable communication bandwidth of the network N1 is 20 Mbps, and the allocable communication bandwidth of the network N2 is 10 Mbps. Therefore, a process for selecting a combination of networks which satisfy the needed communication bandwidths of the communication services in the case of the examples in FIG. 3 and FIG. 4 is described below.

Firstly, the communication control device 200 considers a combination of networks (called "combination A" in FIG. 8 below) wherein both the communication services S1 and S2 are connected to the connectable network N1. Since the allocable communication bandwidth 20 Mbps of the network N1 is equal to or greater than the total value of the needed communication bandwidth of the communication services S1, S2 (10+5=15 Mbps), then the requirements of both the communication services S1, S2 are satisfied and this combination can be used. Consequently, the communication control device 200 selects combination A as a combination of networks which satisfy the needed communication bandwidth of the respective communication services. In the example in FIG. 4, the terminal devices 100-1 and 2 can both connect to the networks N1, N2, and the combination of networks which satisfy the needed communication bandwidths of the respective communication services is equivalent to the combination of networks that can be used by the communication services.

Next, the communication control device 200 considers a combination of networks where the communication service S1 is connected to network N1 and the communication service S2 is connected to network N2 (called "combination B" in FIG. 8 below). Since the allocable communication bandwidth, 20 Mbps, of the network N1 is equal to or greater than the needed communication bandwidth, 10 Mbps, of the communication service S1, then it is possible to satisfy the requirement of the communication service S1. The allocable communication bandwidth 10 Mbps of the network N2 is equal to or greater than the needed communication bandwidth, 5 Mbps, of the communication service S2, and therefore it is possible to satisfy the requirement of the communication service S2. Consequently, the communication control device 200 selects combination B as a combination of networks which satisfies the needed communication bandwidths of the respective communication services.

Next, the communication control device 200 considers a combination of networks where the communication service S1 is connected to the network N2 and the communication service S2 is connected to the network N1 (called "combination C" in FIG. 8). Similarly to combination B, it is possible to satisfy the needed communication bandwidths of the communication services S1, S2, and therefore, the communication control device 200 selects combination C as a combination of networks which satisfies the needed communication bandwidths of the communication services.

Next, the communication control device 200 considers a combination of networks where both of the communication services S1, S2 are connected to the network N2 (called "combination D" below). The allocable communication bandwidth, 10 Mbps, of the network N2 is smaller than the total of the needed communication bandwidths of the communication services S1, S2 (10+5=15 Mbps), and therefore it is not possible to satisfy the requirements of both of the communication services S1, S2 at the same time. Therefore, the communication control device 200 does not select the combination D as a combination of networks that satisfies the needed communication bandwidths of the communication services.

In this way, in the selection process S101, the communication control device 200 selects a combination of usable networks which satisfy the requirements of all of the communication services. In the present embodiment, the combinations A, B and C are selected.

Upon completing the selection process S101, the communication control device 200 calculates the total communication cost per unit time for each of the plurality of combinations of usable networks selected by the selection process S101 (S102). In the example in FIG. 3, the communication cost per unit time of the network N1 is 10 yen/Mbps, and the communication cost per unit time of the network N2 is 1 yen/Mbps. Below, a cost calculation process (S102) for calculating the total communication cost per unit time is described.

The communication control device 200 calculates the respective total communication costs of the combinations A, B and C selected by the selection process S101 (S102), as illustrated in FIG. 8.

Firstly, the communication control device 200 calculates the total communication cost of combination A. Combination A uses a total communication bandwidth of 15 Mbps, for the communication services S1 and S2 relative to the Network N1. Therefore, 150 yen (10 yen/Mbps×15 Mbps) per unit time is charged as a communication cost for the use of the network N1. The network N2 is not used, and therefore is not subject to a communication cost. Consequently, the total communication cost of combination A is calculated as 150 yen/second.

As illustrated in FIG. 8, the communication control device 200 also calculates the total communication cost of combinations B and C. As a result of the calculation, the total communication cost of the combination B is 105 yen/second, and the total communication cost of the combination C is 60 yen/second.

When the cost calculation process S102 is completed, the communication control device 200 chooses the combination resulting in the smallest total communication cost, from among the selected plurality of networks (S103). In the case of this example, the combination C which has a total communication cost of 60 yen/second is selected as the combination of networks to be allocated to the communication services, as illustrated in FIG. 8.

When the network selection process S103 has completed, as represented in FIG. 7 the connection destination is instructed to the terminal devices which are executing the communication services S1, S2 (S14, S15). The connection destination instruction includes information about the networks allocated to the respective communication services, and the terminal devices connect to the networks instructed for each communication service, in accordance with the connection destination instructions. The communication services can communicate with a target content server 600, by means of the terminal devices connected to the respective networks (S16, S17).

In the first embodiment, the communication control device 200 selects the combination of networks to which the terminal devices 100-1 and 2 are to connect. On the other hand, if the terminal device itself selects the network to connect to, then the following process is used.

When the terminal device preferentially selects a network having a cheap communication cost, then the terminal devices 100-1 and 2 select the network N2 having a cheap communication cost (in other words, combination D).

Furthermore, if the terminal device preferentially selects a network having a fast communication rate, then the terminal device, for example, determines the communication rate from the allocable communication bandwidth of the network, and determines the communication speed from the ratio of unused resources of the network. When determining from the allocable communication bandwidth, the terminal devices 100-1 and 2 select a network N1 which has a large allocable communication bandwidth (in other words, combination A). Furthermore, when determining from the ratio of unused resources of the networks, the terminal devices 100-1 and 2 select a network which is not connected to one of the terminals devices (in other words, combination B or C).

In this way, when the terminal device itself selects the network to connect to, then it is not possible to predict which combination of networks will be selected, based on the settings of the terminal device. Consequently, the communication cost paid to the MNO by the MVNO is not smallest (for example, FIG. 8 illustrates a case where connections are made according to combination B). On the other hand, in the first embodiment, the communication control device 200 selects the combination of networks to be used by the communication services of the terminal devices in such a manner that the communication cost of the plurality of communication services is smallest, and controls the terminal device and the network such that the combination of selected networks is implemented (for example, FIG. 8 illustrates a case where connection is made by combination C). By adopting this configuration, it is possible to make the total communication cost of using the networks smallest, while satisfying the requirements of the plurality of communication services.

<First Modification Example>

In the first embodiment, as illustrated in FIG. 1, the communication control device 200 connects with the networks N1, N2 and the terminal devices 100, via the Internet.

Figure 9:
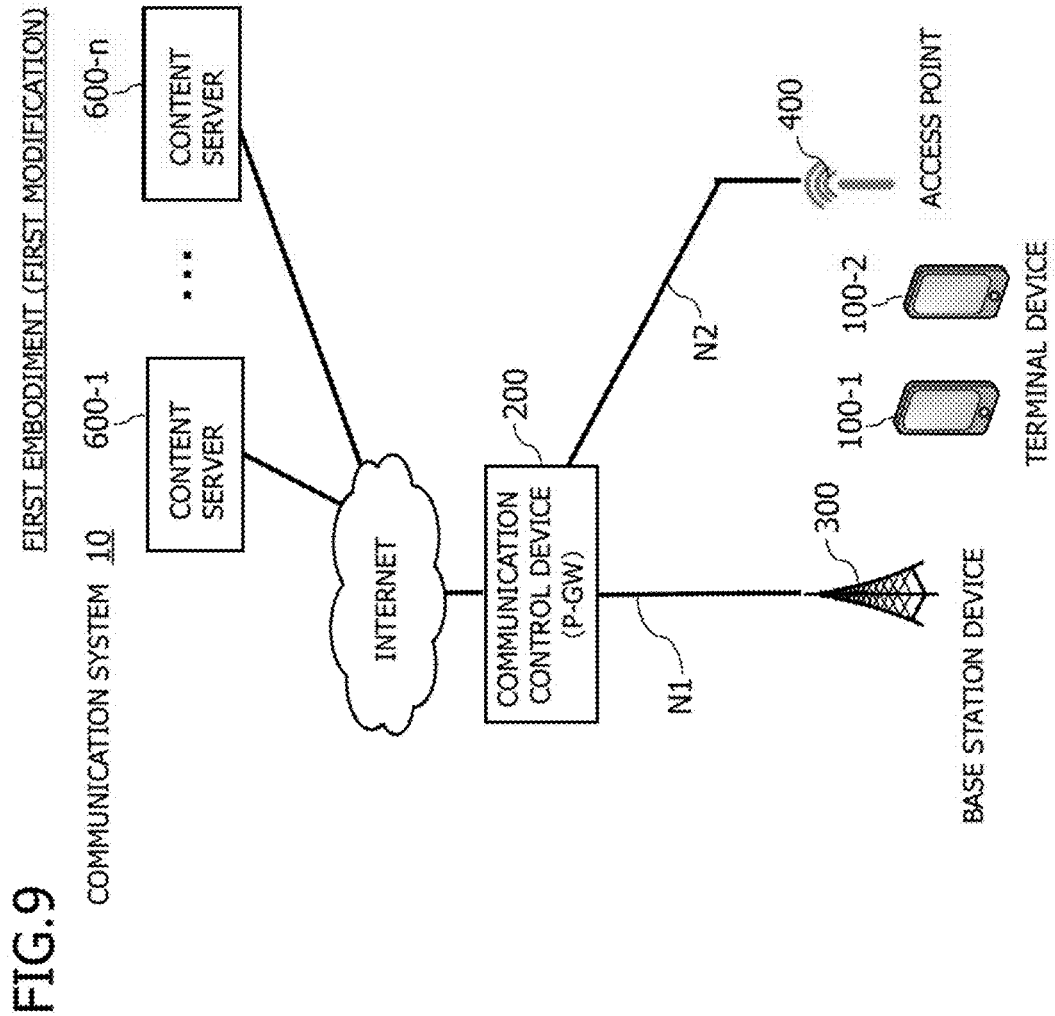
FIG. 9 is a diagram illustrating an example of the configuration of a communication system 10 according to a first modification example.

FIG. 9 is a diagram illustrating an example of the configuration of a communication system 10 according to a first modification example. In the communication system 10 in FIG. 9, a communication control device 200 is disposed at the position where the P-GW 500 is disposed in FIG. 1. The communication control device 200 is, for example, a device in which the functions of a communication control device are installed in the P-GW 500. The communication control device 200 according to the first modification example has the functions of a P-GW, as well as the functions described in the first embodiment. The P-GW functions are, for example, functions for relaying a plurality of networks, and transmitting received packets to a network to which a destination device is connected. Furthermore, a further P-GW function is a function for collecting charge information by counting the number of packets transmitted and received by each connected network.

In this way, by arranging the communication control device 200 in place of the P-GW which is present in a convention communication system, it is possible to suppress the costs of introducing a new device. Furthermore, the communication control device 200 is able to communicate with the networks N1, N2 and the terminal device 100, without passing via the Internet, and therefore it is possible to suppress the occurrence of communication costs due to the use of the Internet apart from the networks N1, N2.

<Second Modification Example>

In the first embodiment, the communication control device 200 acquires the needed communication bandwidth of the communication services from the terminal device 100 as communication service information, but in the second modification example, the information acquired as communication service information is an identifier of the applications which are executing a communication service. In the first embodiment, the communication control device 200 acquires the needed communication bandwidths of the communication services from the terminal devices, but in the second modification example, the needed communication bandwidths corresponding to the communication services are extracted from the needed communication bandwidth information 2210.

Figure 10:
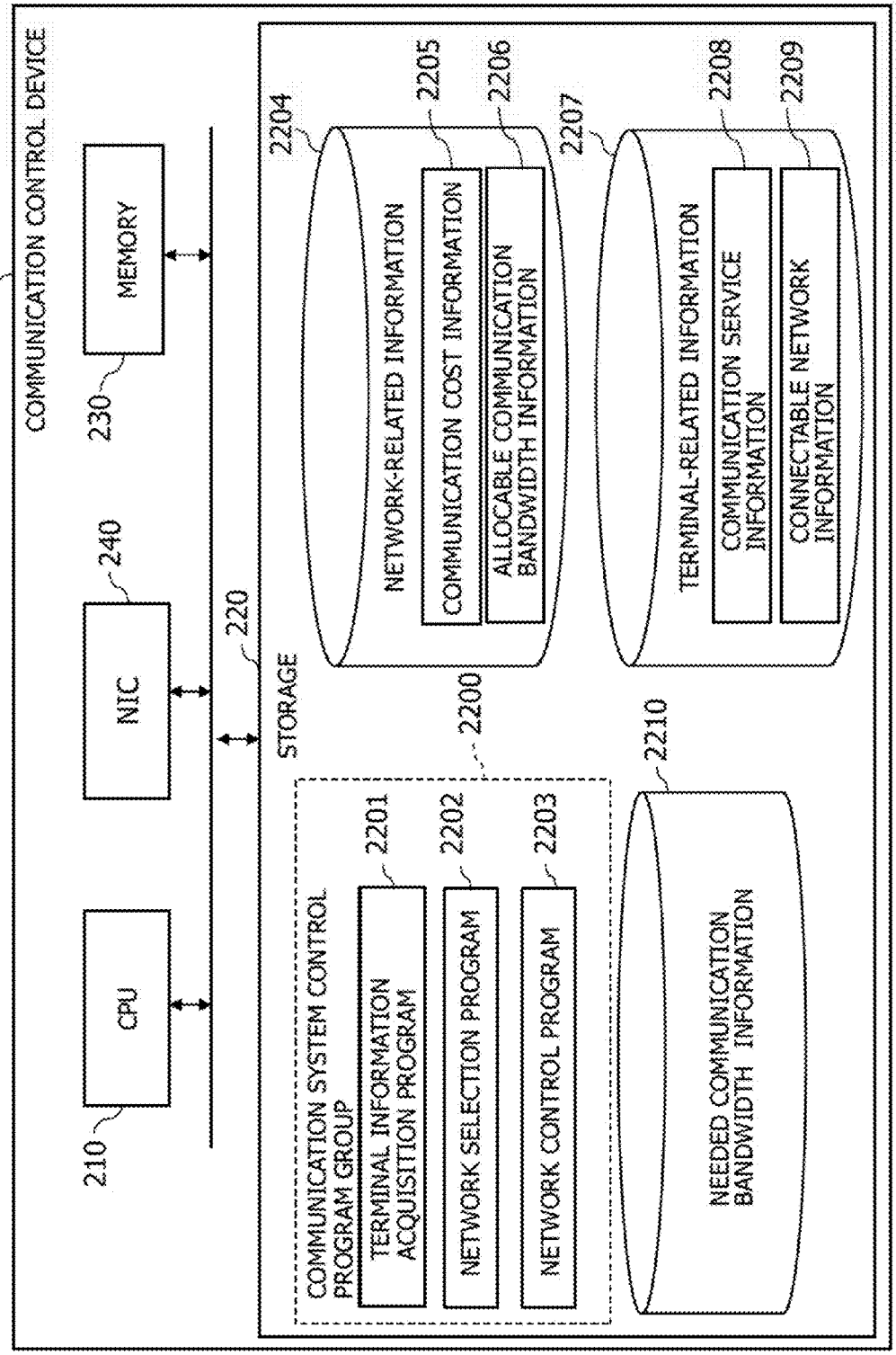
FIG. 10 is a diagram illustrating an example of the configuration of the communication control device 200 according to the second modification example.

FIG. 10 is a diagram illustrating an example of the configuration of the communication control device 200 according to the second modification example. The communication control device 200 has needed communication bandwidth information 2210, in addition to the configuration of the communication control device 200 of the first embodiment.

FIG. 11 is a diagram illustrating an example of the needed communication bandwidth information 2210. The information stored in the needed communication bandwidth information 2210 is "application program" and "needed communication bandwidth (Mbps)".

The "application program" is an identifier, such as an identifier (ID) or program name, etc. of an application program which executes a communication service. The communication service S1 is executed by executing the program of the communication service S1. The "needed communication bandwidth (Mbps)" is a needed communication bandwidth needed by communication services implemented by executing the "application program". The communication control device 200 stores the needed communication bandwidth corresponding to the applications S1 to Sm in the needed communication bandwidth information 2210. m is a numerical value equal to or greater than n, and the communication control device 200 stores the needed communication bandwidth of all of the communication services that may possibly be used by the terminal devices of the communication system 10. In the case of FIG. 11, for example, since the communication service S1 is for moving image delivery, then a large communication bandwidth of 10 Mbps is needed.

FIG. 12 is a diagram illustrating an example of terminal-related information according to a second modification example. In the first embodiment, as illustrated in FIG. 4, the communication service information 2208 is the needed communication bandwidth. However, in the second modification example, as illustrated in FIG. 12, the communication service information 2208 is an application program name. The terminal device 100 transmits to the communication control device 200 usable network information and an application program name achieving the communication service as terminal-related information.

The communication control device 200 extracts the needed communication bandwidth corresponding to the application program name acquired by the terminal-related information 2207, from the needed communication bandwidth information 2210. The communication control device 200 executes the abovementioned communication system control process, by setting the needed communication bandwidth that has been extracted, as the needed communication bandwidth of the communication service.

In the second modification example, the needed communication bandwidth is extracted by using the identifier of the application program, but it is also possible to use the service type of the communication service, instead of the identifier of the application program. The service type is, for example, a type which indicates which kind of service the communication service is, for example, a moving image delivery service or music delivery service, etc. For instance, if the service type is moving image delivery, then since the communication volume is large, a large communication bandwidth is needed. On the other hand, if the service type is music delivery or still image acquisition, for example, then the communication volume is small and a small communication bandwidth suffices. In this way, the needed communication bandwidth may be determined in accordance with the service type.

In the second modification example, the terminal device 100 does not transmit the needed communication bandwidth, but rather an identifier of the communication service. Therefore, for instance, it is possible to use a message which includes existing identifiers for communication services in a communication system. Furthermore, the terminal device 100 does not have to be provided with a region which stores a needed communication bandwidth for each communication service, and does not have to be provided with a process for extracting the needed communication bandwidth.

[Second Embodiment]

Next, a second embodiment will be described. The communication bandwidth that can be allocated to the terminal device by the network is determined on the basis of the base station devices and access points, etc. which constitute the network. However, the communication bandwidth of a base station that can be allocated to a terminal device varies with the modulation and coding scheme (MCS) of the terminal device. Therefore, in the second embodiment, the network selection process is executed by taking account of the MCS of the terminal device.

<Example of Configuration of Communication Control Device>

Figure 13:
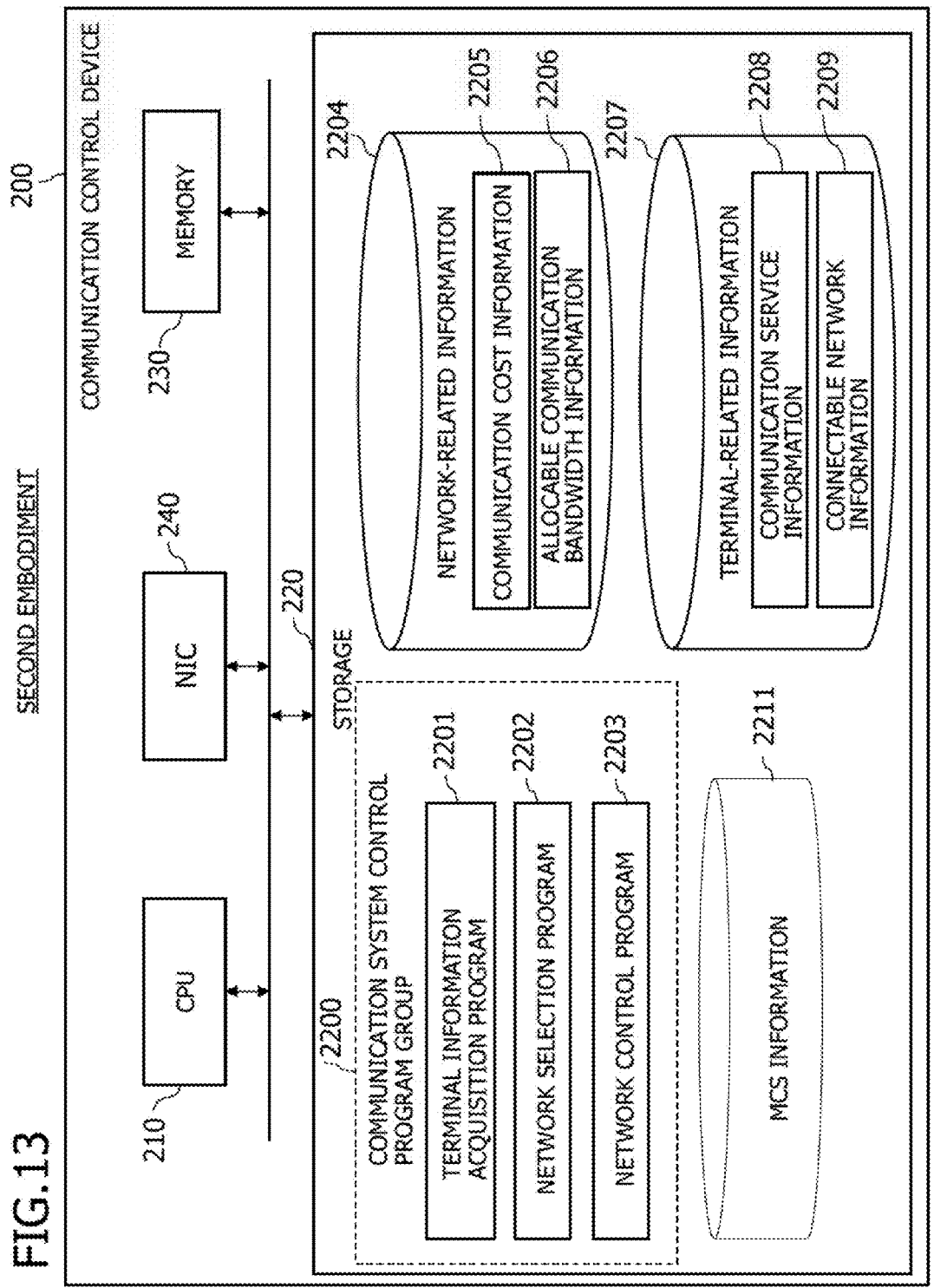
FIG. 13 is a diagram illustrating an example of the configuration of the communication control device 200.

FIG. 13 is a diagram illustrating an example of the configuration of the communication control device 200. The communication control device 200 has MCS information 2211 in the storage 220, in addition to the configuration of the communication control device according to the first embodiment. Furthermore, the information elements of the terminal-related information 2207 and the network-related information 2204 differ from the first embodiment. Below, the information of the communication control device 200 will be described.

FIG. 14 is a diagram illustrating an example of the MCS information 2211. The communication control device 200 stores the MCS information 2211 for each network. In the case of the communication system in FIG. 1, the MCS information of the networks N1, N2 is stored. The MCS information 2211 includes "MCS" and "maximum communication bandwidth (Mbps)", as information elements. "MCS" is the index of the radio quality. For example, if the networks N1 and N2 are networks having different standards, then the MCS index is different for each of the networks. "Maximum communication bandwidth (Mbps)" is the maximum communication bandwidth that can be allocated to one terminal device corresponding to the index of the MCS. In the case of the example in FIG. 14, for instance, if the MCS of the terminal device 100 is "1", then the network N1 can allocate a maximum communication bandwidth of 15 Mbps to the terminal device 100.

FIG. 15 is a diagram illustrating an example of the terminal-related information 2207. The information in the communication service information 2208 differs compared to the first embodiment.

The terminal-related information 2207 also includes the information element "MCS". "MCS" is the index of the radio quality of the terminal device 100 that is executing a communication service. In the example in FIG. 15, the MCS of the terminal device 100-1 that is executing the communication service S1 is "3" in respect of network N1, and "102" in respect of network N2.

FIG. 16 is a diagram illustrating an example of the network-related information 2204 according to a second embodiment. The information stored as the allocable communication bandwidth information 2206 differs in comparison with the first embodiment.

The allocable communication bandwidth information 2206 is stored as the "allocable communication bandwidth (Mbps)". The "allocable communication bandwidth (Mbps)" stores the communication bandwidth that can be allocated to each terminal device executing a communication service. The communication control device 200 extracts the allocable communication bandwidth relating to the terminal devices executing each of the communication services, on the basis of the MCS information 2211 and communication service information 2208, and stores this in the network-related information 2204. For example, as illustrated in FIG. 15, the MCS relating to network N1 is "3" for the communication service S1 and is "2" for the communication service S2. In the case of this example, the communication control device 200 extracts the allocable communication bandwidth "25" corresponding to the terminal device 100-1 executing the communication service S1, and the allocable communication bandwidth "23" corresponding to the terminal device 100-2 executing the communication service S2, on the basis of the MCS information of the network N1 illustrated in FIG. 14. The communication control device 200 stores the allocable communication bandwidth for each terminal device, in a case where the terminal devices executing the extracted communication services are occupying all of the wireless resources, in the "allocable communication bandwidth (Mbps)" of the network-related information.

<Communication System Control Process>

The sequence of the communication system control process is the sequence in FIG. 7, similarly to the first embodiment. In the second embodiment, the network selection process (S13) differs from the first embodiment, and therefore is described below.

Figure 17:
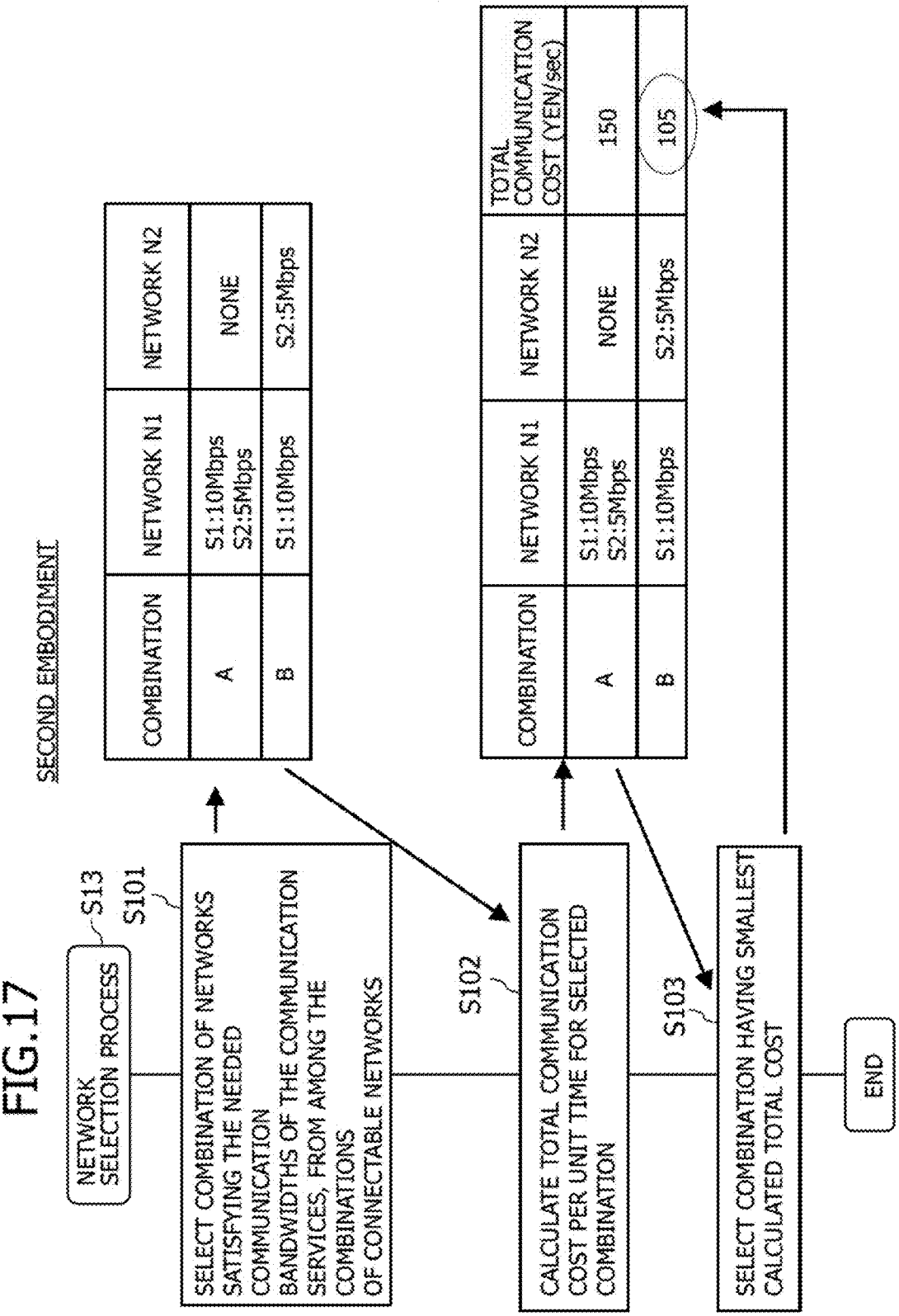
FIG. 17 is a diagram illustrating an example of a flowchart of a network selection process according to the second embodiment.

FIG. 17 is a diagram illustrating an example of a flowchart of a network selection process according to the second embodiment. The communication control device 200 selects a combination of networks that can be used by each of the communication services (S101). In the second embodiment, the allocable communication bandwidth varies depending on the terminal device executing the communication service, and therefore a combination of networks is selected on the basis of the ratio of resources allocated by the networks when the needed communication bandwidths of the communication services are satisfied.

Firstly, the communication control device 200 calculates the ratio of resources used by the networks in a case where the needed communication bandwidths of the communication services executed by the terminal devices are satisfied. FIG. 18 is a diagram illustrating an example of the ratio of resources for each of the communication services being executed by the terminal devices, and the total ratio of resources for each combination. This is explained below with reference to FIG. 18.

The Table F1 in FIG. 18 is a diagram illustrating the ratio of resources in table format. The table F1 indicates, as a percentage, the ratio of resources used by each network, when the needed communication bandwidths of the communication services are satisfied.

For example, a case is described in which the resources which satisfy the 10 Mbps needed communication bandwidth of the communication service S1 executed by the terminal device 100-1 are allocated to the network N1. The allocable communication bandwidth for the terminal device 100-1 executing the communication service S1 on the network N1 is 25 Mbps, and in order to allocate 10 Mbps, 40% of the resources (=10 Mbps/25 Mbps×100%) is used. The communication control device 200, similarly, calculates the ratio of resources used by the networks in a case where the needed communication bandwidths of the communication services executed by the terminal devices are satisfied.

Thereupon, the communication control device 200 calculates the total ratio of the resources of the networks for each combination of networks, and selects a combination which yields a calculation result of 100% or lower.

Table F2 in FIG. 18 illustrates the total ratio of resources of the networks, using the results of the table F1. Table F2 illustrates the results of calculating the total ratio of resources used by the networks in relation to combinations A to D described in the first embodiment, on the basis of table F1.

Combination A is described below. Combination A is a combination where the terminal devices 100-1 and 2 which execute the communication services S1 and S2 are connected to the network N1. The ratio of the resources of the network N1 used by the communication services S1 and S2 is respectively "40%" and "22%", from table F1. The total ratio of resources used by the network N1 in combination A is (40+22%)=62%. Therefore, the combination A is a combination that is achieved by using 62% of the total resources (100%) of the network N1, and is selected as a combination that can satisfy the needed communication bandwidth of the respective communication services.

In this way, the total value of the ratio used by the networks in each of the combinations is calculated, and a combination in which the total value for each network is no greater than 100% is selected as a combination that can satisfy the needed communication bandwidths of the communication services. In the case of table F2, the network N2 in combination C is at 112%, and the network N2 in combination D is 156%, and therefore the combinations C and D are not selected as combinations that can satisfy the needed communication bandwidths of the communication services.

Below, the total communication cost per unit time of the selected combinations is calculated (S102), and the combination having the smallest calculated cost is chosen (S103). In the present embodiment, the combination B is chosen, as illustrated in FIG. 17.

In the second embodiment, the ratio of resources used by the network is calculated for each of the communication services executed by the terminal devices, and a combination in which the calculated total ratio is no greater than 100% is selected. By adopting this configuration, it is possible to select a combination of networks having the smallest total cost, while satisfying the requirements of the communication services, in cases there the terminal devices have respectively different MCS.

[Third Embodiment]

Next, a third embodiment will be described. In the first embodiment, the combination of networks which yields the smallest total communication cost per unit time is selected. In the third embodiment, the combination which yields the smallest integral communication cost as obtained by integrating the communication cost per unit time with respect to time, is selected on the basis of the data volume communicated by each of the communication services.

<Example of Configuration of Communication Control Device>

The configuration of the communication control device 200 is similar to the first embodiment. The communication service information 2208 of the terminal-related information 2207 is different to the first embodiment.

FIG. 19 is a diagram illustrating an example of the terminal-related information 2207 according to the third embodiment. The terminal-related information 2207 includes, as communication service information 2208, "scheduled data volume (Mbit)". The "scheduled data volume (Mbit)" means the data volume that is scheduled by the communication service. For example, if the communication service S1 is a moving image delivery service, then the scheduled data volume is the size of moving images acquired from the content server 600 by the communication service S1. In the third embodiment, the scheduled data volume is acquired from the terminal device executing the communication service.

<Communication System Control Process>

Figure 20:
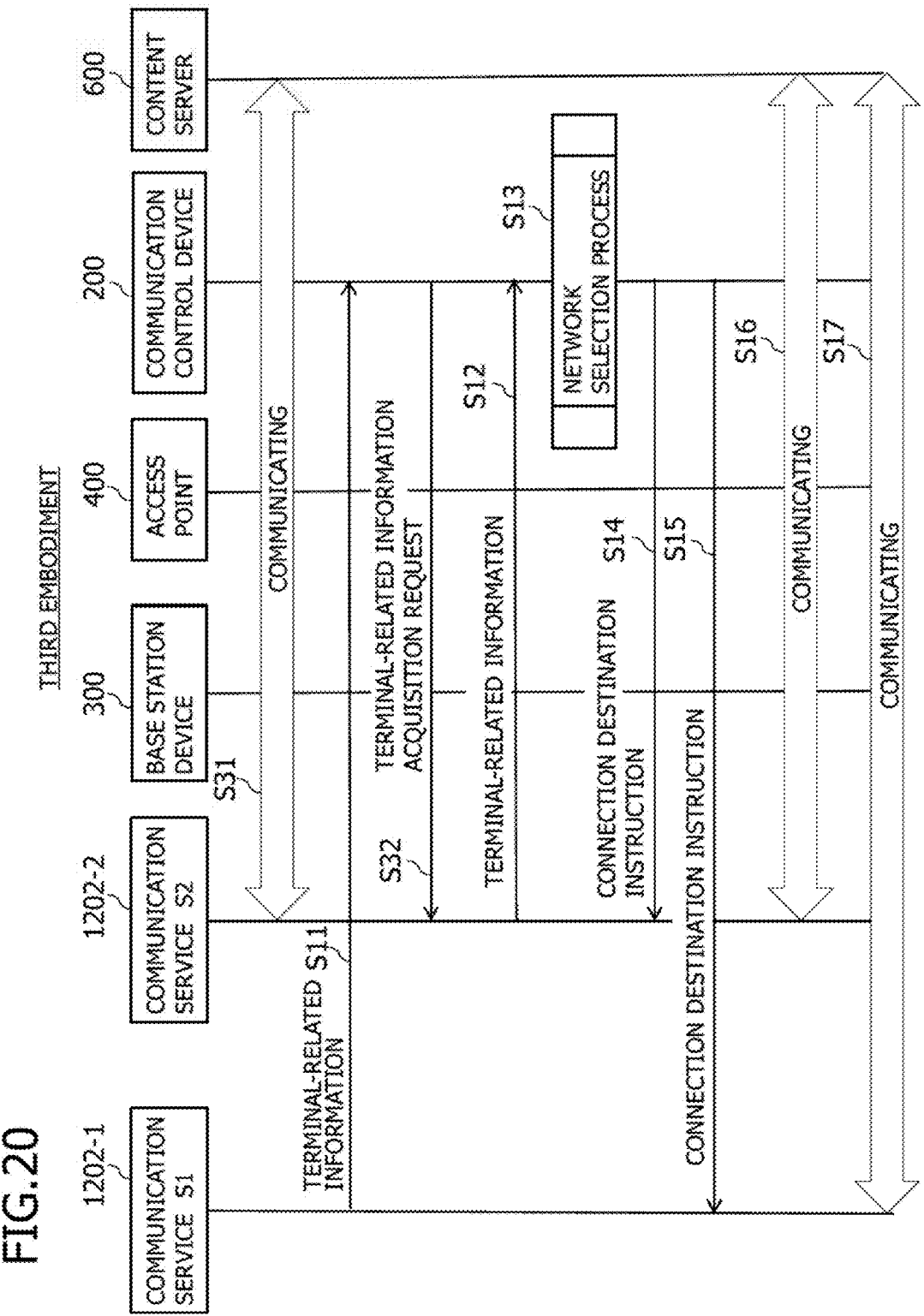
FIG. 20 is a diagram illustrating an example of a sequence of a communication system control process according to a third embodiment.

FIG. 20 is a diagram illustrating an example of a sequence of a communication system control process according to a third embodiment. In the third embodiment, this is a sequence in which the communication service S1 starts communication while the communication service S2 is in a communicating state (S31). Since the communication service S2 is communicating, then a prescribed volume of communication has already been performed, and it is needed to acquire the scheduled data volume again.

The communication control device 200, upon receiving terminal-related information from the communication service S1 (S11), transmits a terminal-related information acquisition request to the communication service S2 which is currently communicating (S32). The communication service S2, upon receiving the terminal-related information acquisition request, calculates the scheduled data volume from the remaining data volume, and includes this in the terminal-related information, and transmits same to the communication control device 200 (S12). The communication control device 200, upon receiving the terminal-related information from the communication service S2, updates the terminal-related information 2207. The sequence thereafter is similar to the sequence in FIG. 7 of the first embodiment.

In the third embodiment, when the combination of networks is selected in this way, then the most recent scheduled data volume for each communication service is acquired, and a combination of networks is selected on the basis of the acquired scheduled data volume.

The network selection process according to the third embodiment (S13) differs from the first embodiment, and therefore is described below.

Figure 21:
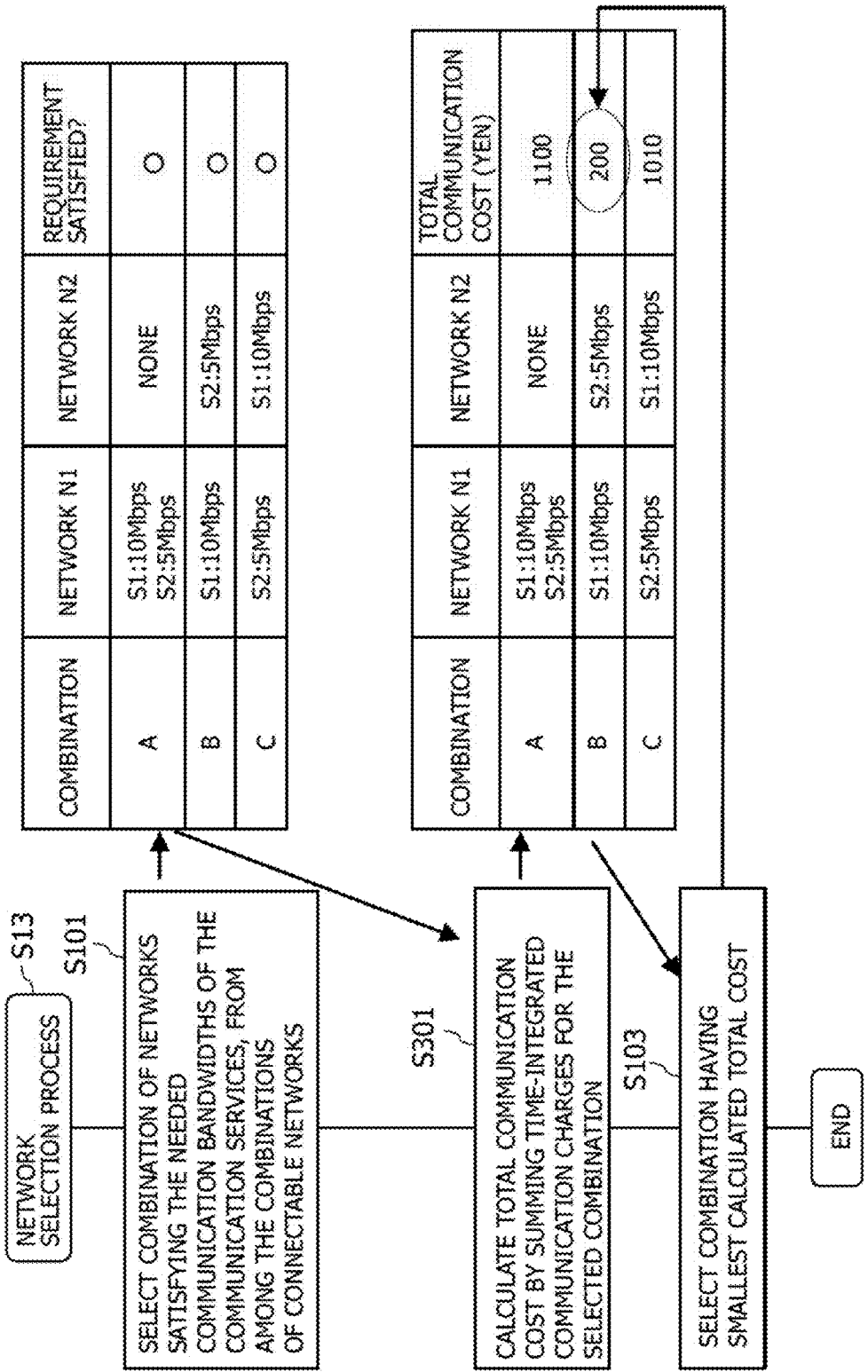
FIG. 21 is a diagram illustrating an example of a flowchart of a network selection process according to the third embodiment.

FIG. 21 is a diagram illustrating an example of a flowchart of a network selection process according to the third embodiment. The selection process (S101) by which the communication control device 200 selects a combination of networks which satisfies the needed communication bandwidths of the communication services is similar to the first embodiment.

In the third embodiment, after the selection process S101 has been completed, a time-integrated communication charge for the selected combination is calculated as a communication cost (S301). The time-integrated communication charge is the integral value obtained by integrating the communication cost per unit time by the time taken to communicate the scheduled data volume. The integral communication charge calculation process S301 is described below. The numerical values in FIG. 3 in the first embodiment are used for the communication cost, but in the third embodiment, the communication cost is an integral value, and therefore the unit of the communication cost may be "yen/Mbit".

The communication control device 200 calculates the communication cost of the combination A. The combination A is a combination in which the communication services S1 and S2 are connected to the network N1. From FIG. 19, the scheduled data volume of the communication service S1 is 10 Mbit. Therefore, in order to transmit 10 Mbit of data at a communication bandwidth of 10 Mbps, it takes one second until data transmission is completed. Furthermore, the network N1 charges 10 yen when a communication bandwidth of 1 Mbps is used for one second, and therefore the charge for using the 10 Mbps communication bandwidth is 100 yen/second. Therefore, the communication cost (time-integrated communication charge) for the communication service S1 to use the network N1 is 100 yen (=100 yen/second×1 second). Similarly, the communication cost for the communication service S2 to use the network N1 is 1000 yen (=50 yen/second×20 seconds). Consequently, the total cost for combination A is 1100 yen (=100 yen+1000 yen).

Similarly, when the total cost for combinations B and C is calculated, then as illustrated in FIG. 21, the respective figures are 200 yen and 1010 yen.

When the integrated communication charge calculation process S301 has been completed, the communication control device 200 selects the combination which yields the smallest calculated total cost (S103). In the case of FIG. 21, the combination B in which the total communication cost is 200 yen is selected.

In the third embodiment, the time of communication is reflected in the communication cost, and the integrated communication charge is calculated as a total communication cost. By adopting this configuration, it is possible to calculate a communication cost which is more practical and takes account of the actual communication time, rather than the combination which yields the smallest communication cost per unit time.

[Fourth Embodiment]

Next, a fourth embodiment will be described. In the first embodiment, the network-related information is stored in an internal memory, such as a storage 220, in advance. In the fourth embodiment, the network-related information is acquired from the base station devices and access points of the networks.

<Communication System Control Process>

Figure 22:
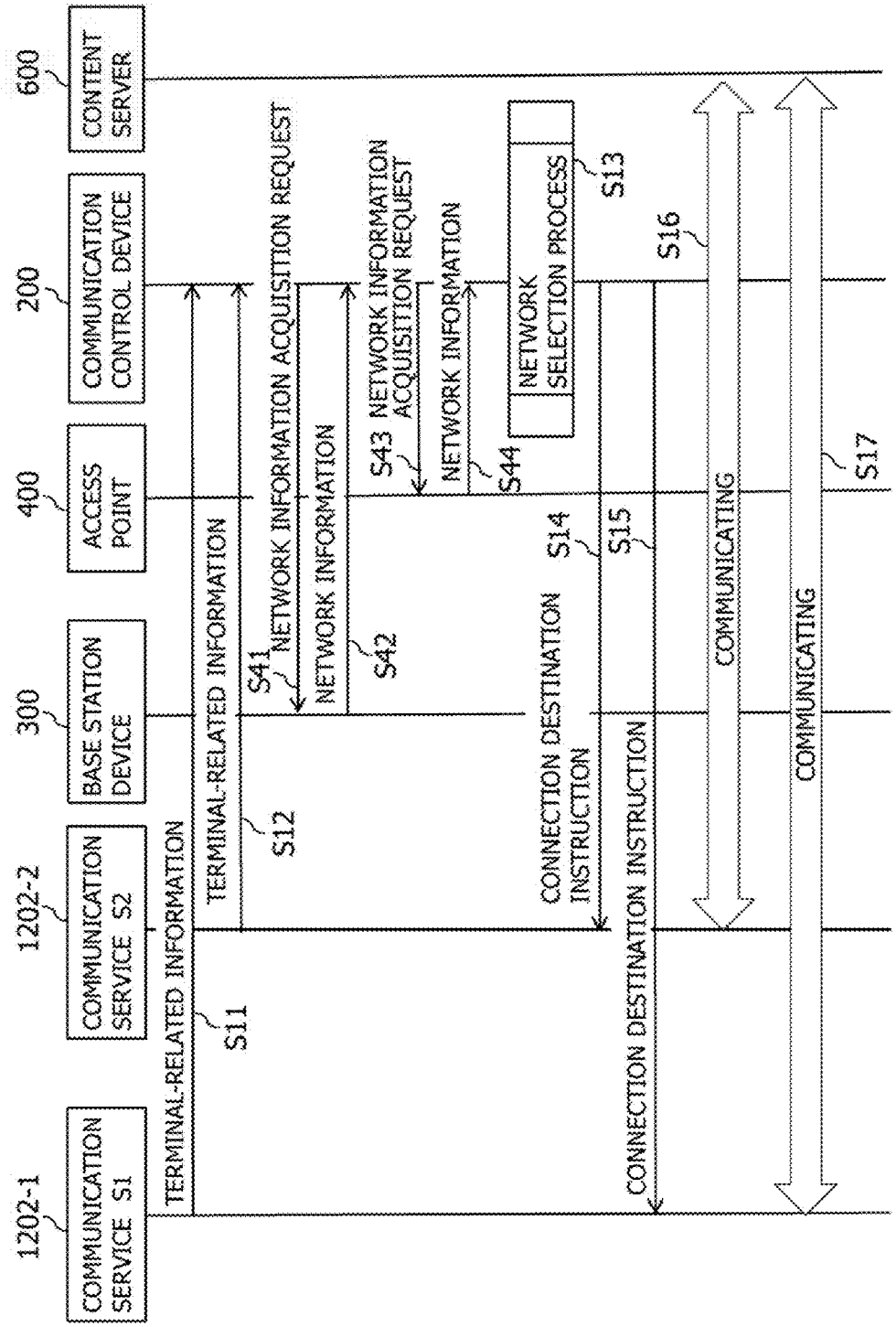
FIG. 22 is a diagram illustrating an example of the sequence of a communication system control process according to the fourth embodiment.

FIG. 22 is a diagram illustrating an example of the sequence of a communication system control process according to the fourth embodiment. The process from the network selection process (S13) onward is similar to the first embodiment, and therefore the process from the reception of terminal-related information (S11) to the reception of network-related information (S44) will be described. The CPU 210 constructs a network acquisition unit which carries out a network information acquisition process by executing the terminal information acquisition program 2201.

The communication control device 200 receives terminal-related information from the communication services S1, S2 (S11, S12). The communication control device 200 extracts a network to which the communication services S1, S2 can be connected, from the connectable network information included in the terminal-related information, and transmits a network-related information acquisition request to the extracted network (S41, S43). In the example in FIG. 4, since the communication services S1, S2 both have the networks N1, N2 as connectable networks, then the network-related information acquisition request is transmitted to the base station device 300 of network N1 and the access point 400 of the network N2.

The base station device 300 and the access point 400, upon receiving the network-related information acquisition request, transmit the network-related information to the communication control device 200 (S42, S44). The communication control device 200 updates the network-related information 2204, upon receiving the network-related information.

In this way, in the fourth embodiment, the network-related information is acquired from the networks. By adopting this configuration, it is possible to acquire the most recent network-related information, and even if there is a change in the network-related information due to change in the configuration of the network, the administrator does not have to carry out an operation for updating the network-related information that has been updated, in the communication control device 200.

The communication control device 200 may also acquire the information relating to the wireless quality of the terminal device from the base station device. For example, in a communication system in which the base station device periodically acquires information relating to the wireless quality by measurement in the terminal device, the communication control device 200 can acquire information relating to the wireless quality of the terminal device from the base station device. The information relating to the wireless quality of the terminal device may be used for calculation of the allocable communication bandwidth. For example, if the wireless quality of the terminal device is poor, then the allocable communication bandwidth may change according to the wireless quality, for instance, the allocable communication bandwidth may become narrower.

[Fifth Embodiment]

Next, a fifth embodiment is described. The fifth embodiment is a communication system 10 provided with a multi-path TCP compatible server, wherein the communication for one communication service can be divided between a plurality of networks.

<Example of Configuration of Communication System>

Figure 23:
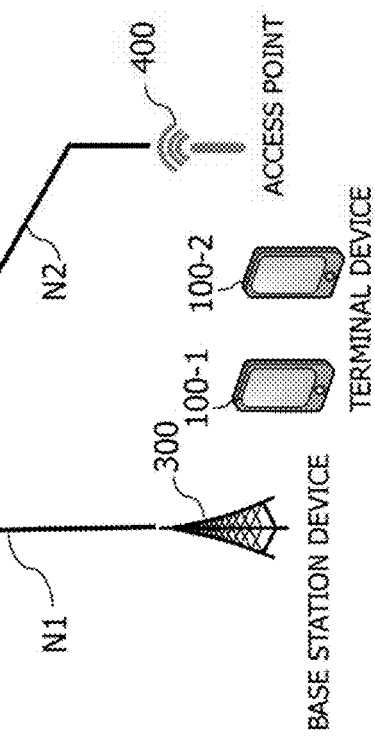
FIG. 23 is a diagram illustrating an example of the configuration of a communication system 10 according to a fifth embodiment.

FIG. 23 is a diagram illustrating an example of the configuration of a communication system 10 according to a fifth embodiment. The communication system 10 has a multi-path TCP compatible server 700, in addition to the configuration of the communication system 10 in FIG. 1.

The multi-path TCP compatible server 700 is a server which transmits to one communication service the received data after dividing the same for a plurality of networks. If the data is divided between a plurality of networks, then a function for joining up the divided data that has been received, in other words, a function corresponding to the reception side of the multi-path TCP, is needed in the terminal device 100.

The communication control device 200, upon selecting the combination of networks, instructs the multi-path TCP compatible server 700 such that the communication bandwidths of the respective networks are to be the combination of the networks selected by the communication control device 200 and communication bandwidths thereof. Furthermore, the communication control device 200 instructs the selected combination of networks to the terminal devices 100, and the terminal devices which have received this instruction connect to the instructed networks. For example, if two networks are allocated to one communication service, then the terminal device 100 connects to two networks.

In this way, in the communication system 10 of the fifth embodiment, the networks which can be used by one communication service may be a single network, or a prescribed combination of communication bandwidths in a plurality of networks.

<Communication System Control Process>

Figure 24:
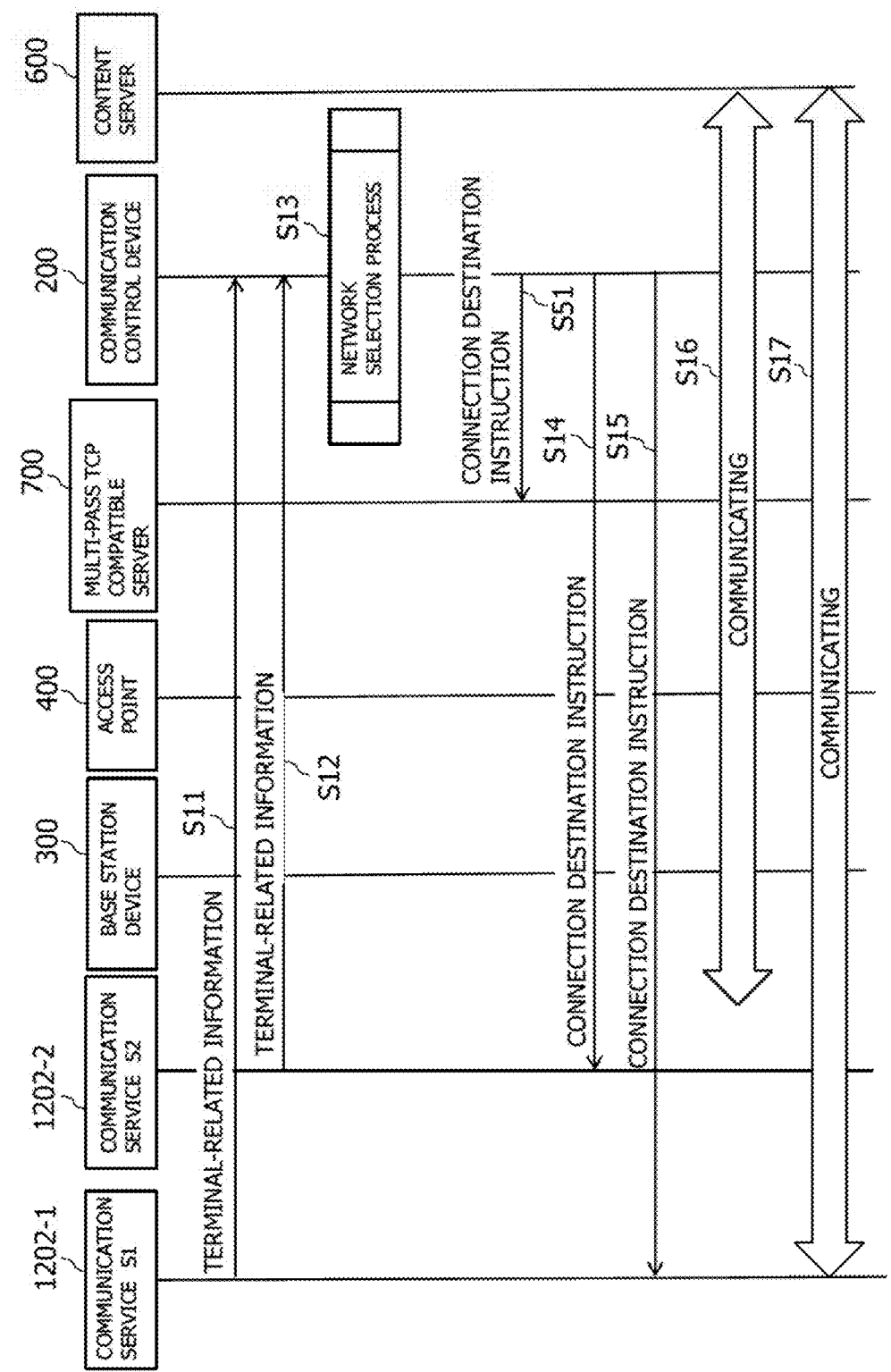
FIG. 24 is a diagram illustrating an example of a sequence of a communication system control process according to a fifth embodiment.

FIG. 24 is a diagram illustrating an example of a sequence of a communication system control process according to a fifth embodiment. The processes apart from the network selection process (S13) and the transmission of the connection destination instruction (S51) is similar to the first embodiment. Upon receiving the terminal-related information (S11, S12), the communication control device 200 carries out the network selection process (S13).

Figure 25:
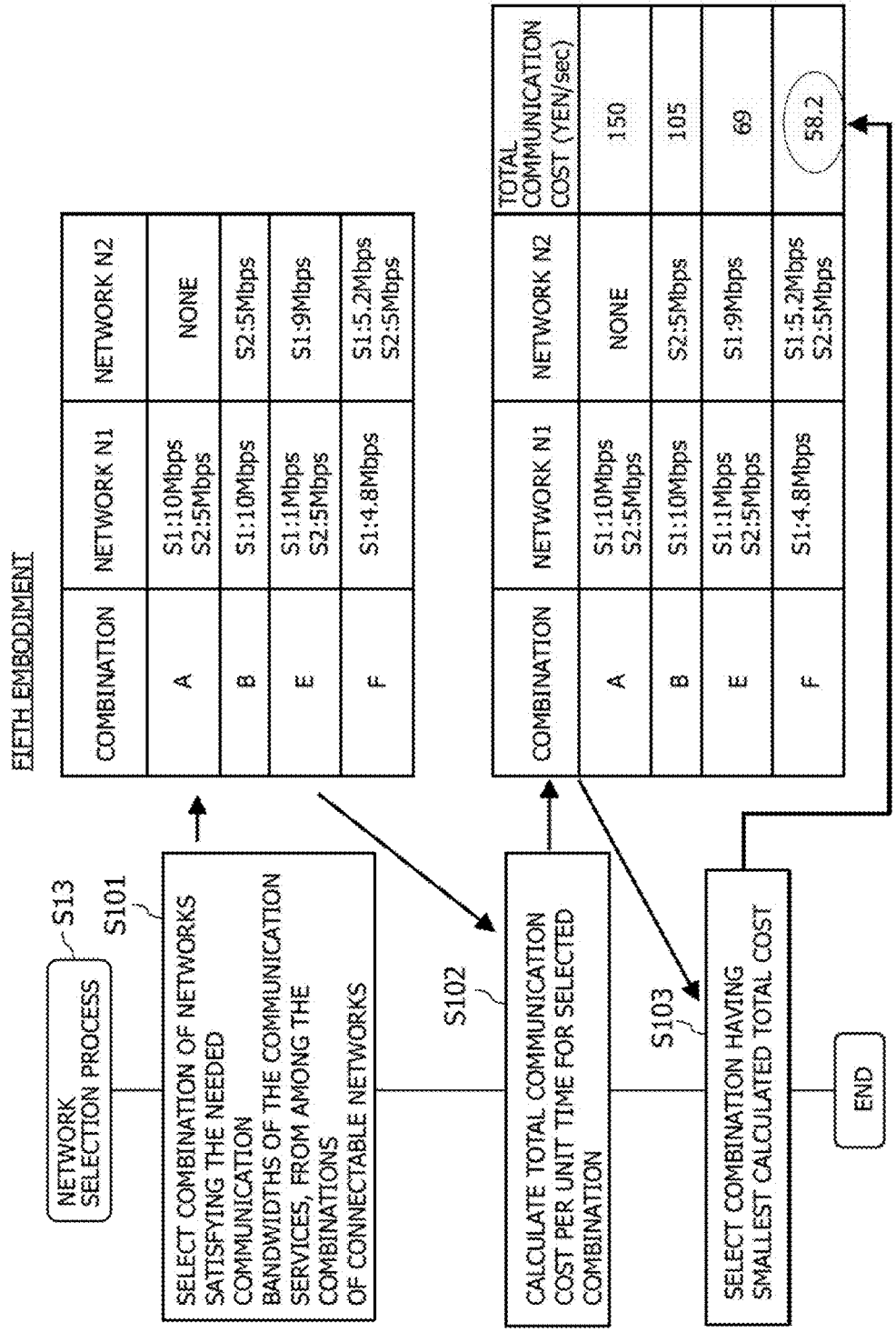
FIG. 25 is a diagram illustrating an example of a flowchart of a network selection process according to a fifth embodiment.

FIG. 25 is a diagram illustrating an example of a flowchart of a network selection process according to a fifth embodiment. Below, an example of a case using the numerical values in FIGS. 14, 15 and 16 is described, similarly to the second embodiment.

The communication control device 200 selects a combination of networks which satisfies the needed communication bandwidths of the communication services. Combinations A and B in which one communication service is connected to one network are selected (S101). With regard to the method of selecting the combinations A and B, the process is the same as the section process S101 in the second embodiment.

Next, a case where one of the communication services is divided between a plurality of networks will be investigated. For example, the 10 Mbps needed bandwidth of the communication service S1 is allocated to network N2, as far as possible. Since the communication bandwidth of the network N2 that can be allocated to the communication service S1 is 9 Mbps, then 9 Mbps is allocated to the communication service S1. The remainder of the needed communication bandwidth for the communication service S1, which is 1 Mbps (=10 Mbps-9 Mbps), is allocated to the network N1. Even if the remaining 1 Mbps of the needed communication bandwidth for the communication service S1 is allocated to the network N1, it is still possible to allocate the 5 Mbps needed communication bandwidth for the communication service S2, from the remaining ratio of resources of the network N1. The combination in which, in the network N1, 1 Mbps is allocated to the communication service S1 and 5 Mbps is allocated to the communication service S2, and in the network N2, 9 Mbps is allocated to the communication service S1, is called combination E. The communication control device 200 selects combination E as a combination which satisfies the needed communication bandwidths of the communication services.

Furthermore, for example, the 5 Mbps needed communication bandwidth for the communication service S2 is allocated to the network N2, as far as possible. Since the communication bandwidth of the network N2 that can be allocated to the communication service S2 is 12 Mbps, then all of the 5 Mbps needed communication bandwidth is allocated to the network N2. In this case, the ratio of used resources of the network N2 is (5 Mbps/12 Mbps×100%=) 42%, and the remaining resources are 58%. These remaining resources are allocated to the communication service S1. Since the communication bandwidth of the network N2 that can be allocated to the communication service S1 is 9 Mbps, then it is possible to allocate (9 Mbps×0.58=) 5.2 Mbps to the communication service S1. Since the needed communication bandwidth of the communication service S1 is 10 Mbps, then the remaining 4.8 Mbps is allocated to the network N1. A combination in which 4.8 Mbps for the communication service S1 is allocated to the network N1, 5.2 Mbps for the communication service S1 is allocated to the network N2, and 5 Mbps for the communication service S2 is allocated to the network N2, is called combination F. The communication control device 200 selects combination F as a combination that satisfies the needed communication bandwidth of the communication services.

In this way, the needed communication bandwidth for a particular communication service is allocated, as far as possible, to one network, and the remainder of the needed communication bandwidth is allocated to another network. The ratio of the remaining resources of the one network is calculated, and the needed communication bandwidth of another communication service is allocated to that network, as far as possible. If all of the needed communication bandwidth for the other communication service are not allocated, then that bandwidth is allocated to another network. The communication control device 200 changes the combination of networks and communication services, investigates whether or not the combinations satisfy the needed communication bandwidths of the communication services, and selects combinations. In the example in FIG. 25 the combinations A, B, E and F are selected.

When the selection process S101 has been completed, the total communication cost per unit time for each of the selected combinations is calculated (S102). The calculation method is the same as the cost calculation process S102 in the first embodiment.

Upon completion of the cost calculation process S102, the communication control device 200 selects the combination yielding the smallest calculated total cost (S103). In the example in FIG. 25, the communication control device 200 selects the combination F which has a total communication cost of 58.2 yen/second.

Upon completion of the network selection process (S13), the communication control device 200 transmits a connection destination instruction to the multi-path TCP compatible server 700, so as to achieve the communication bandwidths in combination F (S51). The connection destination instruction includes information about the selected combination of networks. If the multi-path TCP compatible server 700 is instructed to adopt combination F, for example, then the data is divided and transmitted to the communication service S1 at a communication bandwidth of 4.8 Mbps to the network N1 and a communication bandwidth of 5.2 Mbps to the network N2.

Upon transmitting the connection destination instruction to the multi-path TCP compatible server 700 (S51), the communication control device 200 then also transmits a connection destination instruction to the terminal devices 100 which are executing the communication services (S14, S15). For example, if the terminal device 100 is instructed to adopt combination F, then the terminal device 100-1 executing the communication service S1 is instructed to connect to both of the networks N1 and N2, and the terminal device 100-2 executing the communication service S2 is instructed to connect to the network N2. The communication control device 200 may omit the connection instruction to the terminal device 100, if the terminal device 100 is in a state of connection with a plurality of connectable networks. Furthermore, if the connection instruction to the terminal device 100 is omitted, then the terminal device 100 may spontaneously connect to all of the connectable networks.

In the fifth embodiment, it is possible to perform communication for one communication service using a plurality of networks. Therefore, the number of options of network combinations that can be selected by the communication control device 200 is increased. By increasing the number of options, there is a greater possibility of being able to select a combination having a lower communication cost. For instance, if the numerical values of the second embodiment are used, then in the second embodiment, the combination B at 105 yen/second would be selected, but in the fifth embodiment, the combination F at 58.2 yen/second could be selected. In this way, there are cases where it is possible to select a combination having a lower communication cost.

[Sixth Embodiment]

Next, a sixth embodiment is described. In the sixth embodiment, the performance of the network that is connected to is also included in the requirements of the communication service. The communication control device 200 selects a combination of networks on the basis of the performance of the network to be connected to, and the needed communication bandwidth.

<Example of Configuration of Communication Control Device>

Figure 26:
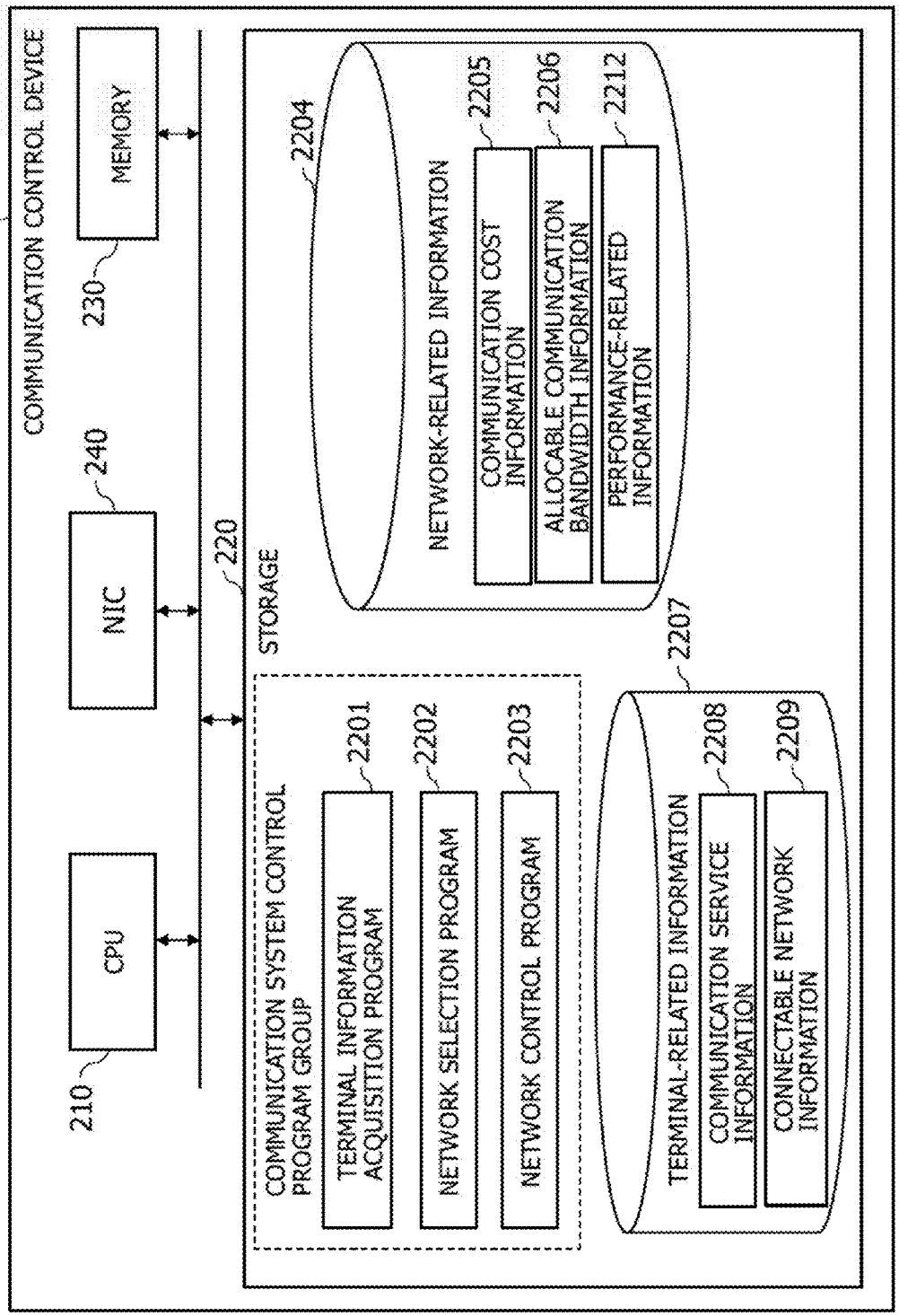
FIG. 26 is a diagram illustrating an example of the configuration of the communication control device 200 according to the sixth embodiment.

FIG. 26 is a diagram illustrating an example of the configuration of the communication control device 200 according to the sixth embodiment. In the sixth embodiment, the network-related information 2204 stored in the communication control device 200 includes performance-related information 2212. The network-related information 2204 and terminal-related information 2207 are described below.

FIG. 27 is a diagram illustrating an example of network-related information 2204 according to the sixth embodiment. The network-related information 2204 includes performance-related information 2212, in addition to the communication cost information 2205 and the allocable communication bandwidth information 2206.

The performance-related information 2212 includes "delay performance (ms)", "jitter performance (ms)" and "packet loss performance (%)". The "delay performance (ms)" indicates the maximum delay time which occurs in packet transmission, when communication has been performed using the network. The lower the numerical value of the "delay performance (ms)", the shorter the time until the packet reaches the communication destination in the network. The "jitter performance (ms)" is a numerical value indicating the maximum extent of jitter that occurs in the network. Jitter is the range of fluctuation in frequency in the signal transmission, and the greater the jitter, the greater the variation in the time until the signal reaches the destination. The "packet loss performance (%)" indicates the maximum percentage loss of packets when packets are sent and received by using the network. A network having a high value of the "packet loss performance (%)" is a network having a large ratio of lost packets and a poor communication quality.

FIG. 28 is a diagram illustrating an example of the terminal-related information 2207 according to the sixth embodiment. The communication service information 2208 includes, in addition to the "needed communication bandwidth (Mbps)", a "needed delay performance", "needed jitter performance" and "needed packet loss performance". The "needed delay performance", "needed jitter performance" and "needed packet loss performance" are the respective performances needed for the communication service, and the numerical values thereof differ with the communication service.

<Communication System Control Process>

The sequence of the communication system control process according to the sixth embodiment is similar to FIG. 7 in the first embodiment. The network selection process (S13) is different to the first embodiment, and therefore is described below.

FIG. 29 is a diagram illustrating an example of a flowchart of the network selection process according to the sixth embodiment. The selection process S101 by which the communication control device 200 selects the combination of networks that satisfy the needed communication bandwidths of the communication services is similar to the first embodiment.

The communication control device 200 selects a combination of networks that satisfy the needed delay performance, needed jitter performance and needed packet loss performance, from among the combinations selected by the selection process S101 (S601).

For example, the networks N1 and N2 satisfy each of the needed delay performance, needed jitter performance and needed packet loss performance of the communication service S2, and the communication service S2 may be allocated to either of the networks N1 and N2. However, since the needed packet loss performance for the communication service S1 is "no more than 0.5%", and the packet loss performance of network N2, "1%", does not satisfy this requirement, then the communication service S1 is not able to be allocated to the network N2. Consequently, the combination C is not selected, since the communication service S1 is allocated to the network N2. In the selection process S601 corresponding to the needed performance, the combinations A and B are selected.

Upon completion of the selection process S601 corresponding to the needed performance, the total of the communication cost per unit time of the selected combination is calculated (S102), and a combination having the smallest calculated cost is selected (S103). In the case of this example, a combination B at 105 yen/second is selected.

In the present embodiment, a combination is selected on the basis of each of the delay performance, jitter performance and packet loss performance. However, the combination may be selected on one performance factor of the delay performance, jitter performance and packet loss performance, and may be selected on the basis of a combination of two performance factors.

In this way, in the sixth embodiment, a combination of networks is selected by taking account of the requirements of the communication service in relation to the performance of the network, apart from the communication bandwidth. By adopting this configuration, it is possible to select networks for using the communication service more appropriately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control device, comprising:
   a terminal information acquisition unit which acquires, from a terminal device, terminal-related information including communication service information relating to a communication service executed by the terminal device, and network information relating to a network to which the terminal device can connect, from among a plurality of networks;
   a selection unit which selects, among a plurality of combinations of networks each of which can be used by each of a plurality of communication services executed by a plurality of terminal devices respectively, a combination of networks having a smallest total communication cost to be charged for each of the plurality of communication services in each of the plurality combinations of networks, on the basis of the terminal-related information, and network-related information including communication cost information relating to a cost to be charged for using the networks, and communication bandwidth information relating to communication bandwidth that can be allocated to the terminal device; and
   a network control unit which executes a network control such that the networks used respectively by each of the plurality of communication services are the selected combination of networks,
   wherein the selection of the combination of networks is made by calculating a ratio of needed communication bandwidth for each of the plurality of communication services in relation to the communication bandwidth that can be allocated to each of the terminal devices in the plurality of networks, and selecting a combination of networks yielding a total calculated ratio of not more than 100% in respect of each of the plurality of networks.

2. The communication control device according to claim 1,
   wherein the selection unit selects the combination of networks by selecting a network to which the needed communication bandwidth needed by the communication services can be allocated, among the networks to which the terminal devices executing the communication services can be connected, in respect of a plurality of communication services executed by the plurality of terminal devices.

3. The communication control device according to claim 2, wherein
   the communication cost information includes a communication charge per unit time which increases in accordance with an allocated communication bandwidth that is allocated to the terminal device; and
   the selection unit calculates a total of the communication cost in accordance with the needed communication bandwidth.

4. The communication control device according to claim 2, wherein
   the communication cost information includes a time-integrated communication charge obtained by multiplying a communication charge per unit time which increases in accordance with an allocated communication bandwidth that is allocated to the terminal device, by a time needed for a data volume communicated by the communication service; and
   the selection unit calculates a total of the communication cost in accordance with the needed communication bandwidth and the data volume of each communication service, for each of the plurality of combinations of networks.

5. The communication control device according to claim 2, wherein the communication bandwidth information relating to communication bandwidth that can be allocated to the terminal device is determined on the basis of modulation and an encoding method of the communication performed by the terminal device, as acquired from the terminal device.

6. The communication control device according to claim 1, wherein the network control includes instructing each terminal device, in which the plurality of communication services are executed, to connect to the selected network.

7. The communication control device according to claim 1, wherein the network control includes instructing a relay device, which relays the plurality of networks, to adopt the selected combination of networks.

8. The communication control device according to claim 1, wherein the networks, in which the communication services can be used, have any prescribed combination of communication bandwidth for one network or a plurality of networks.

9. The communication control device according to claim 8, wherein the control includes issuing instruction to a server, which transmits received packets to a terminal device executing the communication service by dividing the packets between the plurality of networks, so that the communication bandwidth of the networks are the prescribed combination of communication bandwidth for the plurality of networks.

10. The communication control device according to claim 1, further comprising a network information acquisition unit which acquires the network-related information relating to the networks, from the networks to which the terminal devices can connect.

11. The communication control device according to claim 1, wherein the network-related information includes information relating to wireless quality of the terminal device.

12. The communication control device according to claim 2, wherein
    furthermore, the communication services request of the networks any of a prescribed delay performance, jitter performance, or packet loss performance, or a combination of the performances; and the plurality of combinations of networks are combinations of networks that satisfies the needs of the communication services.

13. A communication control method, comprising:

acquiring, from a terminal device, terminal-related information including communication service information relating to a communication service executed by the terminal device, and network information relating to a network to which the terminal device can connect, from among a plurality of networks;

selecting, among a plurality of combinations of networks each of which can be used by each of a plurality of communication services executed by a plurality of terminal devices respectively, a combination of networks having a smallest total communication cost to be charged for each of the plurality of communication services in each of the plurality combinations of networks, on the basis of the terminal-related information, and network-related information including communication cost information relating to a cost to be charged for using the networks, and communication bandwidth information relating to communication bandwidth that can be allocated to the terminal device; and executing a network control such that the networks used respectively by each of the plurality of communication services are the selected combination of networks, wherein the selecting includes calculating a ratio of needed communication bandwidth for each of the plurality of communication services in relation to the communication bandwidth that can be allocated to each of the terminal devices in the plurality of networks, and selecting a combination of networks yielding a total calculated ratio of not more than 100% in respect of each of the plurality of networks.

14. A communication control system, comprising:
a terminal device;
a plurality of networks; and
a communication control device, wherein
the communication control device includes:
a terminal information acquisition unit which acquires, from a terminal device, terminal-related information including communication service information relating to a communication service executed by the terminal device, and network information relating to a network to which the terminal device can connect, from among a plurality of networks;

a selection unit which selects, among a plurality of combinations of networks each of which can be used by each of a plurality of communication services executed by a plurality of terminal devices respectively, a combination of networks having a smallest total communication cost to be charged for each of the plurality of communication services in each of the plurality combinations of networks, on the basis of the terminal-related information, and network-related information including communication cost information relating to a cost to be charged for using the networks, and communication bandwidth information relating to communication bandwidth that can be allocated to the terminal device; and a network control unit which executes a network control such that the networks used respectively by each of the plurality of communication services are the selected combination of networks, wherein the selection of the combination of networks is made by calculating a ratio of needed communication bandwidth for each of the plurality of communication services in relation to the communication bandwidth that can be allocated to each of the terminal devices in the plurality of networks, and selecting a combination of networks yielding a total calculated ratio of not more than 100% in respect of each of the plurality of networks.

* * * * *